(12) United States Patent
Wald et al.

(10) Patent No.: US 10,504,275 B2
(45) Date of Patent: Dec. 10, 2019

(54) METHODS AND APPARATUS FOR MORE EFFICIENT RAY TRACING OF INSTANCED GEOMETRY

(71) Applicant: Intel IP Corporation, Santa Clara, CA (US)

(72) Inventors: Ingo Wald, Salt Lake City, UT (US); Sven Woop, Völklingen (DE); Carsten Benthin, Völklingen (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 16/024,042

(22) Filed: Jun. 29, 2018

(65) Prior Publication Data

US 2018/0308273 A1    Oct. 25, 2018

Related U.S. Application Data

(63) Continuation of application No. 15/086,033, filed on Mar. 30, 2016, now Pat. No. 10,043,303.

(51) Int. Cl.
  *G06T 15/50* (2011.01)
  *G06T 15/06* (2011.01)
  *G06T 15/00* (2011.01)

(52) U.S. Cl.
  CPC ............ *G06T 15/06* (2013.01); *G06T 15/005* (2013.01)

(58) Field of Classification Search
  None
  See application file for complete search history.

(56) References Cited

U.S. PATENT DOCUMENTS

| 6,597,359 | B1 * | 7/2003 | Lathrop | G06T 15/06 345/420 |
| 8,212,816 | B1 * | 7/2012 | Hoberock | G06T 15/06 345/426 |
| 8,471,845 | B1 * | 6/2013 | Stich | G06T 15/06 345/419 |
| 8,823,736 | B2 | 9/2014 | Barringer et al. | |
| 9,547,932 | B2 | 1/2017 | Karras et al. | |
| 2003/0043147 | A1 * | 3/2003 | Heim | G06T 15/40 345/421 |
| 2008/0088622 | A1 * | 4/2008 | Shearer | G06T 15/06 345/421 |
| 2008/0122845 | A1 * | 5/2008 | Brown | G06T 15/005 345/427 |

(Continued)

FOREIGN PATENT DOCUMENTS

WO    2017/171959 A1    10/2017

OTHER PUBLICATIONS

Wald, et al., "Distributed Interactive Ray Tracing of Dynamic Scenes," 9 pages, Computer Graphics Group, Saarland University.

(Continued)

*Primary Examiner* — Martin Mushambo
(74) *Attorney, Agent, or Firm* — Spectrum IP Law Group LLC

(57) ABSTRACT

Methods and apparatus relating to more efficient ray tracing of instanced geometry are described. In an embodiment, overlapping instances are unbraided, by not instantiating the entire objects, but instantiating multiple sub-BVH nodes of the objects, which improves rendering performance by reducing overlap of BVH nodes. Other embodiments are also disclosed and claimed.

21 Claims, 17 Drawing Sheets

(56) References Cited

U.S. PATENT DOCUMENTS

| | | | | |
|---|---|---|---|---|
| 2008/0231633 | A1* | 9/2008 | Keller | G06T 1/60 345/426 |
| 2009/0167763 | A1* | 7/2009 | Waechter | G06T 15/06 345/426 |
| 2009/0189898 | A1* | 7/2009 | Dammertz | G06T 15/06 345/426 |
| 2009/0295805 | A1* | 12/2009 | Ha | G06T 15/06 345/426 |
| 2010/0289799 | A1* | 11/2010 | Hanika | G06T 15/06 345/421 |
| 2011/0080403 | A1* | 4/2011 | Ernst | G06T 15/06 345/420 |
| 2011/0122135 | A1* | 5/2011 | Kim | G06T 1/20 345/426 |
| 2012/0050289 | A1* | 3/2012 | Park | G06T 15/06 345/426 |
| 2012/0268483 | A1* | 10/2012 | Soupikov | G06T 1/60 345/619 |
| 2013/0016109 | A1* | 1/2013 | Garanzha | G06T 15/06 345/501 |
| 2013/0187947 | A1 | 7/2013 | Barringer et al. | |
| 2013/0235050 | A1* | 9/2013 | Karras | G06T 1/20 345/505 |
| 2013/0321420 | A1 | 12/2013 | Laine et al. | |
| 2014/0028666 | A1* | 1/2014 | Lee | G06T 15/06 345/419 |
| 2014/0078143 | A1* | 3/2014 | Lee | G06T 15/06 345/426 |
| 2014/0285488 | A1* | 9/2014 | Sevastiyanov | G06T 15/06 345/426 |
| 2014/0347355 | A1* | 11/2014 | Yoon | G06T 15/06 345/419 |
| 2014/0362074 | A1* | 12/2014 | Karras | G06T 15/06 345/419 |
| 2014/0365532 | A1* | 12/2014 | Karras | G06F 17/30292 707/803 |
| 2015/0138202 | A1* | 5/2015 | Lee | G06T 15/06 345/426 |
| 2015/0170396 | A1* | 6/2015 | Kornmann | G06T 15/005 345/419 |
| 2015/0279092 | A1 | 10/2015 | Per et al. | |
| 2015/0302629 | A1* | 10/2015 | Obert | G06T 15/06 345/426 |
| 2016/0093090 | A1* | 3/2016 | Shin | G06T 15/06 345/419 |

OTHER PUBLICATIONS

Wikipedia, "Bounding Volume Hierarchy," retrieved on Dec. 10, 2015, 3 pages, retrieved from URL <https://en.wikipedia.org/wiki/Bounding_volume_hierarchy.

"Distributed Interactive Ray Tracing of Dynamic Scenes," abstract, Oct. 2003, 2 pages, IEEE, Seattle, WA.

International Search Report and Written Opinion for International Application No. PCT/US2017/012219, dated Apr. 11, 2017, 13 pages.

International Preliminary Report on Patentability for International Application No. PCT/US2017/012219, dated Oct. 11, 2018, 8 pages.

* cited by examiner

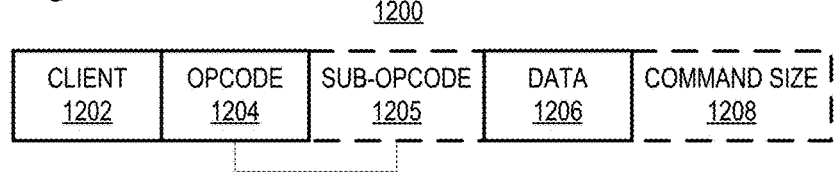
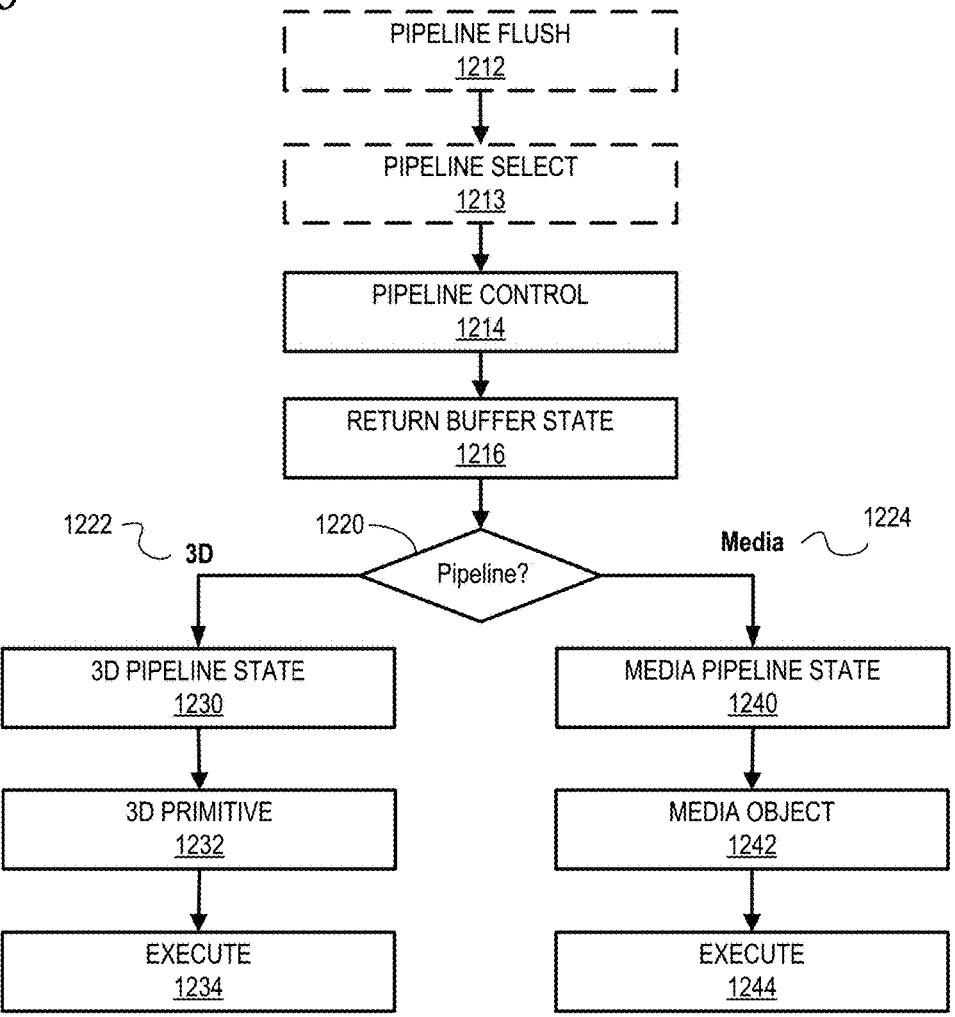

METHODS AND APPARATUS FOR MORE EFFICIENT RAY TRACING OF INSTANCED GEOMETRY

RELATED APPLICATIONS

This application is a continuation and claims priority under 35 U.S.C. § 120 of pending U.S. patent application Ser. No. 15/086,033, filed Mar. 30, 2016, entitled METHODS AND APPARATUS FOR MORE EFFICIENT RAY TRACING OF INSTANCED GEOMETRY. The entire disclosure(s) of these documents are incorporated by reference herein for all purposes.

FIELD

The present disclosure generally relates to the field of electronics. More particularly, some embodiments relate to techniques for more efficient ray tracing of instanced geometry.

BACKGROUND

In digital image processing, rendering generally refers to the process associated with generation of an image from a two dimensional (2D) or three dimensional (3) model. The 2D/3D model may include various objects with differing geometries. One rendering technique may utilize ray tracing to simulate the natural flow of light. However, ray tracing is a highly compute-intensive task that consumes a large number of compute cycles (especially in movie production where multiple images per second are involved), and often only implementable on very high-end computing systems, e.g., utilizing large-scale rendering compute farms.

BRIEF DESCRIPTION OF THE DRAWINGS

The detailed description is provided with reference to the accompanying figures. In the figures, the left-most digit(s) of a reference number identifies the figure in which the reference number first appears. The use of the same reference numbers in different figures indicates similar or identical items.

FIGS. 12A and 12B illustrate graphics processor command format and sequence, respectively, according to some embodiments.

DETAILED DESCRIPTION

In the following description, numerous specific details are set forth in order to provide a thorough understanding of various embodiments. However, various embodiments may be practiced without the specific details. In other instances, well-known methods, procedures, components, and circuits have not been described in detail so as not to obscure the particular embodiments. Further, various aspects of embodiments may be performed using various means, such as integrated semiconductor circuits ("hardware"), computer-readable instructions organized into one or more programs ("software"), or some combination of hardware and software. For the purposes of this disclosure reference to "logic" shall mean either hardware, software, firmware, or some combination thereof.

As mentioned above, while ray tracing is a useful technique in digital image processing, its use may only be possible by having access to very high-end computing farms, e.g., utilizing thousands of high-end computer servers. Moreover, when dealing with complex movie content, a technique can be used to reduce memory consumption (referred to as "instantiation"), in which certain objects that occur multiple times in a scene (such as a certain type of a car or a character) are stored only once. The stored object(s) can then be re-used multiple times at varying positions in the same scene. Hence, rather than storing multiple copies of the same object, instantiation allows for storage of the object only once, with multiple (e.g., transformed) references being used for placing the object(s) at different positions in a scene hierarchy.

To this end, some embodiments provide methods and apparatus for more efficient ray tracing of instanced geometry. In one embodiment, a method and data structure are used that can significantly improve ray tracing performance for scenes that use instantiation of geometry.

Figure 1:
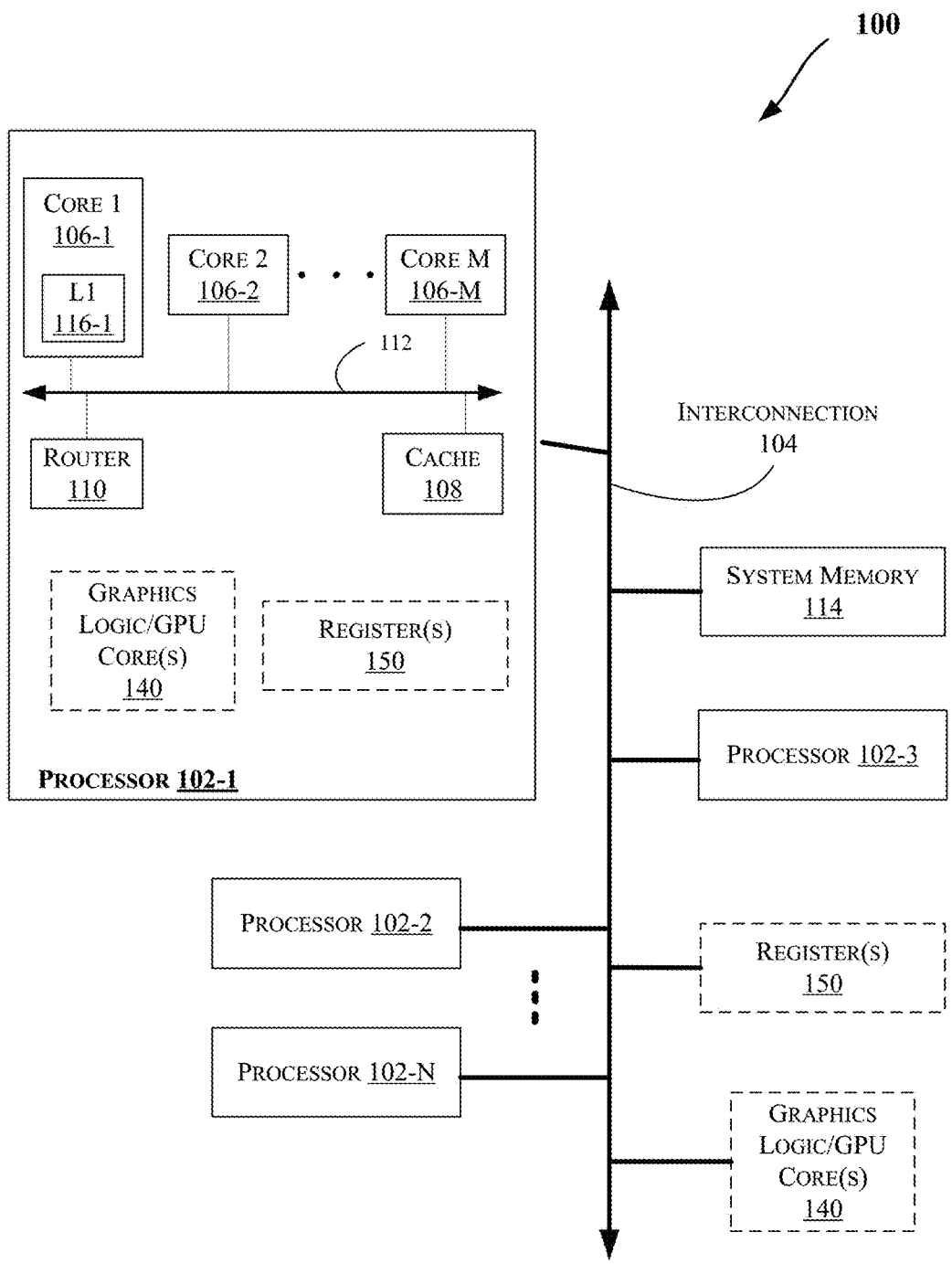
FIGS. 1, 3, 4, 13, and 15 illustrate block diagrams of embodiments of computing systems, which may be utilized to implement various embodiments discussed herein.

Further, some embodiments may be applied in computing systems that include one or more processors (e.g., with one or more processor cores), such as those discussed with reference to FIGS. 1-15, including for example mobile computing devices, e.g., a smartphone, tablet, UMPC (Ultra-Mobile Personal Computer), laptop computer, Ultrabook™ computing device, wearable devices (such as a smart watch or smart glasses), etc. More particularly, FIG. 1 illustrates a block diagram of a computing system 100, according to an embodiment. The system 100 may include one or more processors 102-1 through 102-N (generally referred to herein as "processors 102" or "processor 102"). The processors 102 may include general-purpose CPUs and/or GPUs in various embodiments. The processors 102 may communicate via an interconnection or bus 104. Each processor may include various components some of which are only discussed with reference to processor 102-1 for clarity. Accordingly, each of the remaining processors 102-2 through 102-N may include the same or similar components discussed with reference to the processor 102-1.

In an embodiment, the processor 102-1 may include one or more processor cores 106-1 through 106-M (referred to herein as "cores 106," or "core 106"), a cache 108, and/or a router 110. The processor cores 106 may be implemented on a single Integrated Circuit (IC) chip. Moreover, the chip may include one or more shared and/or private caches (such as cache 108), buses or interconnections (such as a bus or interconnection 112), graphics and/or memory controllers (such as those discussed with reference to FIGS. 3-15), or other components.

In one embodiment, the router 110 may be used to communicate between various components of the processor 102-1 and/or system 100. Moreover, the processor 102-1 may include more than one router 110. Furthermore, the multitude of routers 110 may be in communication to enable data routing between various components inside or outside of the processor 102-1.

The cache 108 may store data (e.g., including instructions) that are utilized by one or more components of the processor 102-1, such as the cores 106. For example, the cache 108 may locally cache data stored in a memory 114 for faster access by the components of the processor 102 (e.g., faster access by cores 106). As shown in FIG. 1, the memory 114 may communicate with the processors 102 via the interconnection 104. In an embodiment, the cache 108 (that may be shared) may be a mid-level cache (MLC), a last level cache (LLC), etc. Also, each of the cores 106 may include a level 1 (L1) cache (116-1) (generally referred to herein as "L1 cache 116") or other levels of cache such as a level 2 (L2) cache. Moreover, various components of the processor 102-1 may communicate with the cache 108 directly, through a bus (e.g., the bus 112), and/or a memory controller or hub.

As shown in FIG. 1, the processor 102 may further include graphics logic 140 (e.g., which may include one or more Graphics Processing Unit (GPU) core(s) such as those discussed with reference to FIGS. 3-15) to perform various graphics and/or general purpose computation(s) related operations such as discussed herein. Logic 140 may have access to one or more storage devices discussed herein (such as video (or image, graphics, etc.) memory, cache 108, L1 cache 116, memory 114, register(s) 150, or another memory in system 100) to store information relating to operations of the logic 140, such as information communicated with various components of system 100 as discussed herein. As discussed herein, the registers 150 may be organized into register file(s) where each register file may include an array of registers to be accessed by a CPU or GPU. Also, while logic 140 and registers 150 are shown inside the processor 102 (or coupled to interconnection 104), they may be located elsewhere in the system 100 in various embodiments. For example, logic 140 may replace one of the cores 106, may be coupled directly to interconnection 112, etc. Also, registers 150 may be directly coupled to interconnection 112, etc.

Figure 2A:
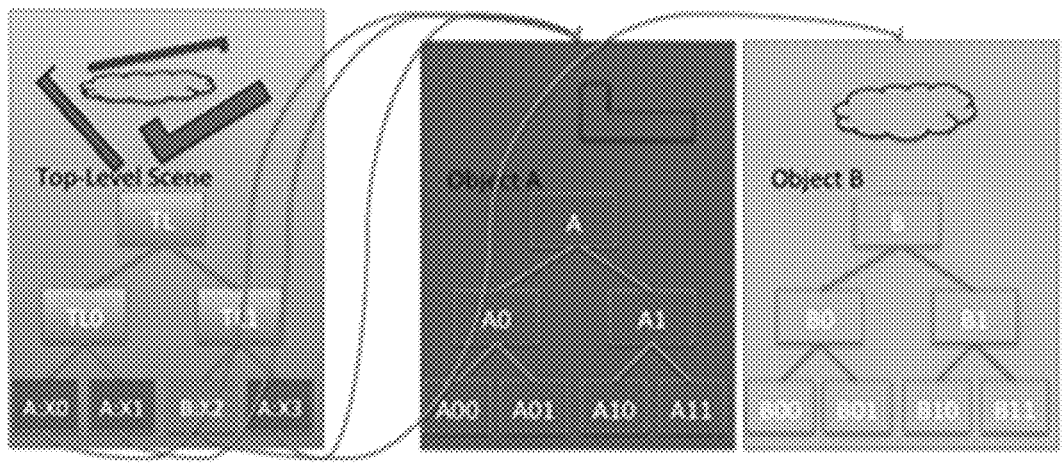
FIG. 2A illustrates a block diagram where multiple transformed references are used for placement of the same objection in scene hierarchy.
Figure 2B:
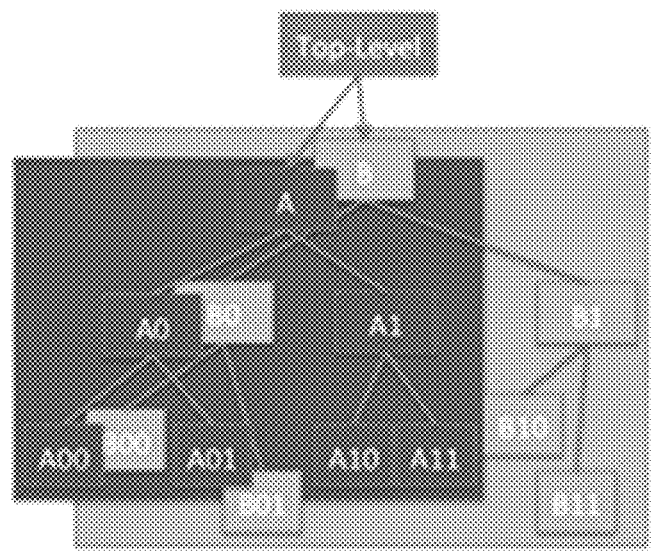
FIG. 2B illustrates a block diagram of a two-level Bounding Volume Hierarchy (BVH) technique that may be used in some implementations.
Figure 2C:
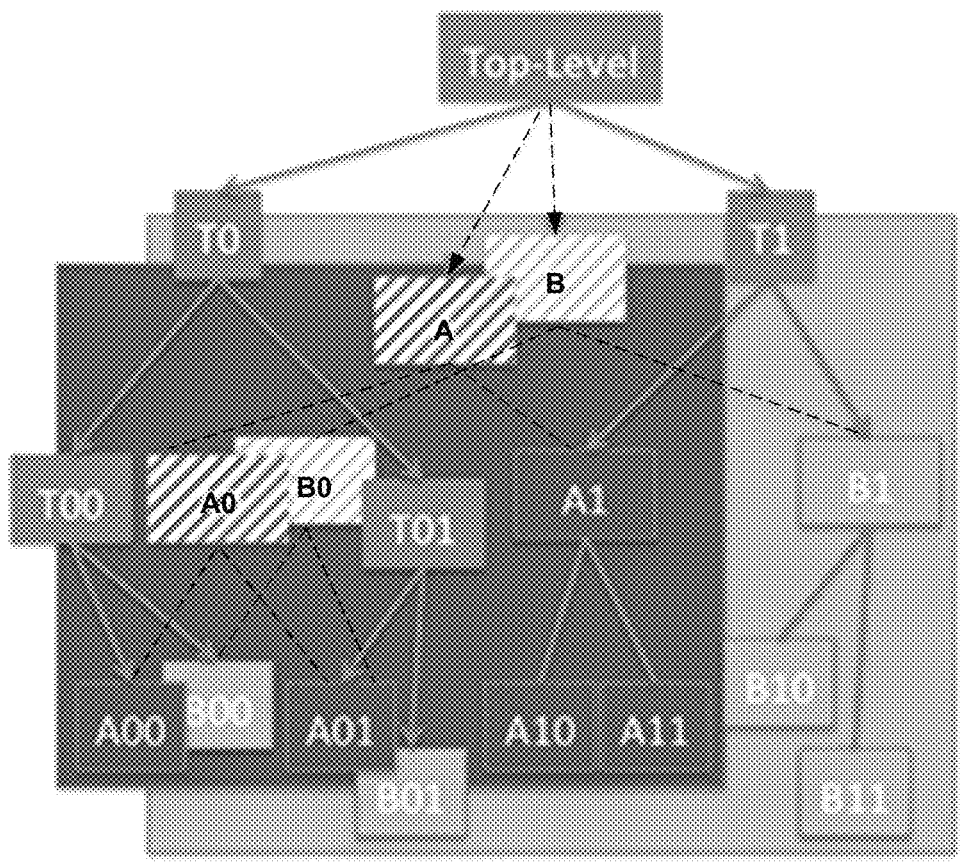
FIG. 2C illustrates a block diagram of a modified BVH structure, according to an embodiment.

FIG. 2A illustrates a block diagram where multiple transformed references are used for placement of the same objection in scene hierarchy. FIG. 2B illustrates a block diagram of a two-level Bounding Volume Hierarchy (BVH) technique that may be used in some implementations. FIG. 2C illustrates a block diagram of a modified BVH structure, according to an embodiment. One or more components discussed with reference to FIG. 1, or 3-15 (such as graphics logic 140 and/or a GPU/core) may be used to perform one or more operations discussed with reference to FIGS. 2C and/or 2D?.

Referring to FIG. 2A, instancing with two-level BVH is shown. The main ("top-level" or "TL") scene refers to transformed objects (where "A:X1" means object A is transformed by matrix X1, etc.). Objects and top-level each have a BVH, and primitives in top-level BVH refer to the entire (e.g., transformed) objects. As shown in FIG. 2A, rather than storing multiple copies of the same object, instantiation allows for storage of the object only once, with multiple (e.g., transformed) references being used for placing the object(s) at different positions in a scene hierarchy.

Referring to FIG. 2B, some implementations for handling instantiation in a ray tracer include building a two-level hierarchy with one level of acceleration structure (e.g., a BVH) over each base object (say, a given type of car), and another level (the "top-level" BVH) over all instances, where each top-level primitive refers to an entire object (and associated transformation). When tracing a ray, the ray is first traced through the top-level BVH (e.g., nodes TL, TL0, and TL1 in FIG. 2A), and then at the leaves (e.g., nodes A:X0, A:X1, B:X2, A:X3 in FIG. 2A), the ray is transformed to the respective instance's object space, where it traverses the object BVH (see, e.g., object A and object B in FIG. 2A).

One problem with the approach of FIG. 2A is that when different instances overlap in world space (or the entire scene), then that same spatial region needs to be traversed multiple times (once per overlapping instance), which leads to significant overhead (e.g., consuming more compute cycles). Thus, though crucial to reduce memory footprint, instancing using such an approach can often come with a significant performance penalty that may make rendering an instanced scene several times as expensive (e.g., in terms of compute cycles) as without instancing (using a single large BVH over the entire geometry).

By contrast, some embodiments (such as illustrated in FIG. 2C) modify the BVH structure to skip those nodes in the instance BVHs that would have led to an overlapping instance, and to instead introduce new and/or better nodes into the top-level BVH that are capable of directly pointing into suitable locations of the instanced object BVHs. This eventually results in a top-level tree that refers to instances' sub-trees which have no (or at least fewer) overlap(s).

More particularly, an embodiment includes: (a) a novel two-level BVH type in which leaves of the top-level BVH do not refer to entire instances (but instead refer to individual BVH sub-trees of the instanced objects (each with the instance's original transformation matrix)); and/or (b) a technique to determine how to build such a new BVH data structure (e.g., to determine which set of subtrees to reference from the top-level BVH).

Figure 2D:
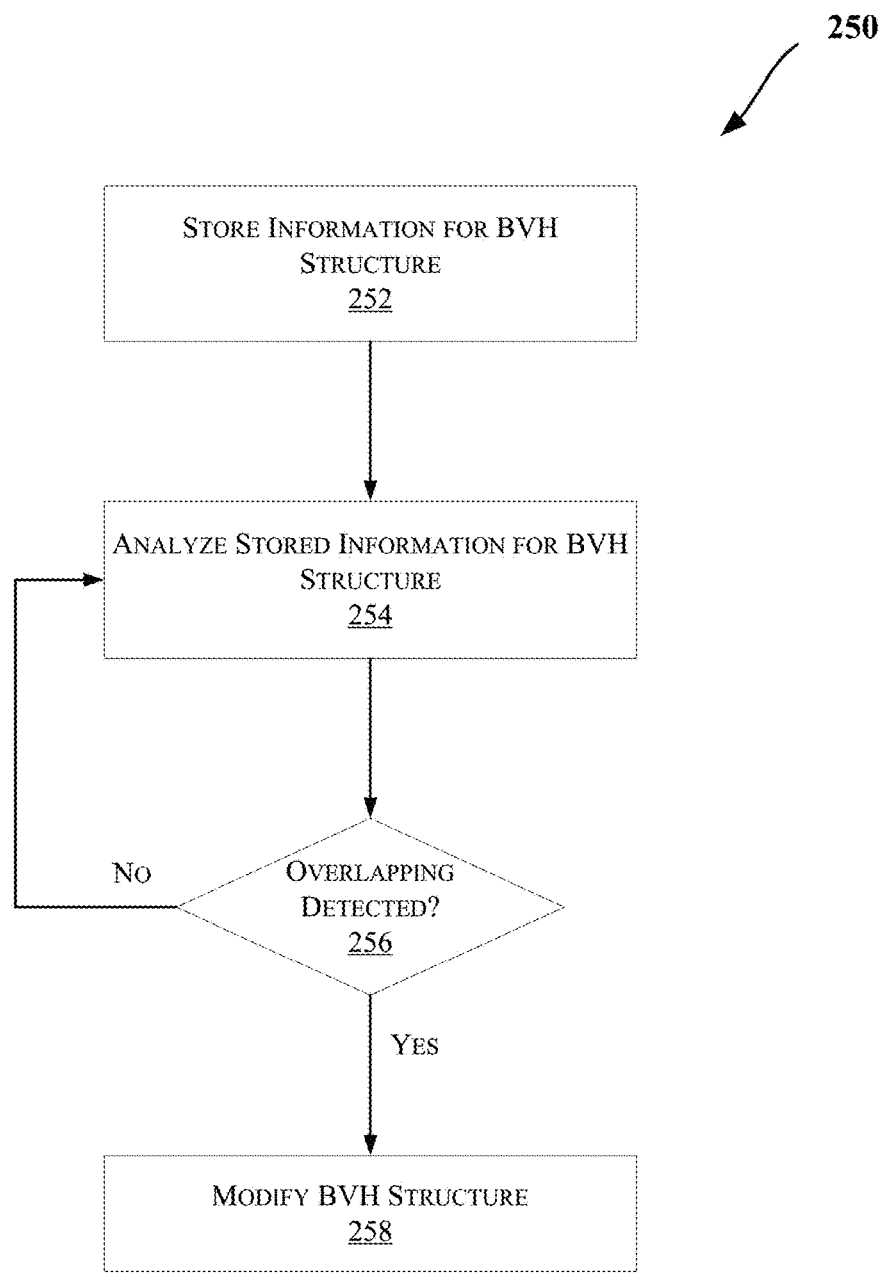
FIG. 2D illustrates a flow diagram of a method according to an embodiment.

FIG. 2D illustrates a flow diagram of a method 250 to skip one or more nodes of a BVH structure which would cause an overlapping instance, according to some embodiments. One or more components discussed herein with reference to FIGS. 1, 3-15 (including for example graphics logic 140 and/or GPU/core) may be used to perform one or more operations discussed with reference to FIG. 2D.

Referring to FIGS. 1-2D, at an operation 252, information corresponding to a BVH structure is stored (e.g., as shown in FIG. 2C). The stored information is then analyzed at operation 254 (e.g., by logic 140 and/or a GPU/core such as those discussed herein). At an operation 256, it is determined whether the stored information of operation 252 identifies one or more overlapping instances (e.g., per analysis of operation 254). And, if overlapping is detected at operation 256, operation 258 modifies the BVH structure such as discussed herein (e.g., to skip one or more nodes that would cause an overlapping instance).

As an example, consider the block diagram of FIG. 2C, in which the dotted lines and cross-hatched boxes refer to the two-level BVH for the setting as shown in FIG. 2B. The data structure would refrain from referencing the strongly overlapping regions (A and B, as well as A0 and B0), and would "skip" these "bad" nodes by introducing new top-level nodes (T0 . . . T01) that refer to more suitable nodes (A00, B00, A01, B01, A1, and B1 as shown in FIG. 2C). These new nodes are considered more suitable, in part, because they would lead to a better tree that can be traversed more efficiently.

In an embodiment, in the case of spatially overlapping instances, the overlap is significantly reduced. Rather than sequentially traversing entire hierarchies, such braided top-level BVH is able to skip (all or most) nodes in instances that would have previously overlapped, and to directly traverse to appropriate sub-trees that do not overlap (or at least, significantly less). This yields significantly higher performance in particular for models that heavily use instancing, such as when many such instances overlap. Thus, in some embodiments, at least some methods and/or data structure(s) can significantly accelerate the rendering or ray-tracing of instances in those cases, and can make instancing (e.g., potentially at a moderate cost in higher memory consumption) nearly as fast as rendering replicated (i.e., non-instanced) geometry.

In one embodiment, the basic data structure is structurally similar to a two-level BVH, with a modification to allow primitives in the top-level BVH to not reference instances, but instead reference specific instance-BVH sub-trees. Moreover, each leaf-primitive in the top-level BVH would be a pair of (instance ID (Identifier), subtree ID), where the instance ID allows for determining the transformation that the object BVH should undergo, as well as the object BVH to which the second parameter (the sub-tree ID) refers.

Traversing such a structure would be simple in accordance with some embodiments. More particularly, the ray first traverses the top-level BVH, and, when reaching a leaf, the ray is transformed to the instance's coordinate system, and jumps right into traversing the respective sub-tree of that instance that the top-level primitive referenced. To avoid repeated transformations of a ray with the same transformation matrix, it is possible (but not required) to cache the result of that transformation (e.g., in a memory/cache such as those discussed with reference to FIGS. 1 and/or 3-15). Extensions to traversal with SIMD (Single Instruction, Multiple Data) or vector instructions similar to traversal of regular BVHes is possible, and so is the extension of such embodiments to other acceleration structures such as multi-branching BVHes, octrees, k dimensional (kd) trees, grids, etc.

In some embodiments, the described construction algorithms assume that some BVH is already build for each object that is instanced. This approach is independent of the algorithm used to build these per-object hierarchies.

Furthermore, for building the data structure, a variety of options exist. For example, one option is to first perform an a-priori "un-braiding" of all object BVHs up to a specific level, or up to a specific size of triangles per subtree, area per (world-space) bounding box of subtree, etc.; this leads to a set of (instance ID, subtree ID) pairs that the top-level BVH can then be built on. Computing the (world-space) bounding box of each such primitive can be done by transforming the respective instance's subtree's bounding box to world space (e.g., using the instance's transformation matrix); or possibly by looking at some of the instance's child boxes or primitives and transforming those. Once appropriate bounding boxes for the top-level primitives are available, any existing BVH builder can be used, including, but not limited to, Surface Area Heuristic (SAH) based, binning based, Morton-code based, etc.

A different option is to do the un-braiding on demand during the top-down construction of the top-level BVH. A standard BVH builder starts with a list of build primitives (in our case pairs of transformation and BVH node from the object BVH). This list of build primitives is split into two lists using some spatial criteria (such as the surface area heuristic). The builder then creates a node, and recurses with the smaller build primitive lists to build the child nodes. When performing some unbraiding before the splitting of the build primitive lists, one can reduce the overlap between the boxes of the child nodes, to improve rendering performance. One further option is to incorporate the un-braiding into the evaluation of the splitting heuristic, to only un-braid a build primitive when this improves the heuristic.

In one embodiment, the un-braiding can operate as follows:

(1) Create a list of all top-level instances; that is, a list over all pairs (G,X) where G is an object to be instanced, and X is the transform it is to be instanced with.

(2) For each (G,X), generate (G,R(G),X), where R(G) is the root node of G's object BVH. Now each triple (G,N,X) refers to a (sub-)tree of an object to be instanced.

(3) Define a suitable function f(G,N,X) to compute the importance of unbraiding a given subtree (G,N,X). A useful example of f would be the surface area of the world space bounding box of the subtree N, Area(bounds(X(N))).

(4) From the given list of (G,N,X)'es that could be unbraided, pick the one with highest priority function. For parallel implementations this picking can also be done approximately.

(5) Remove the picked (G,N,X) from the list, and insert (G,C0(N),X), (G,C1(N),X), etc. into the list, where C0(N), C1(N), etc. are the children of node N.

(6) Iterate 4-5 until a certain termination criterion—such as, for example, a total number of splits is performed—is reached.

(7) Build a top-level BVH over all (G,N,X)'es in that list.

Other variations may be used in various embodiments. For construction variants, one or more of the following may be used:

(a) For the termination criterion, one could also consider relative number of new nodes generated, number of splits performed, total or relative memory overhead, a target fraction of unbraided BVH nodes per input primitive, a target fraction of unbraided BVH nodes per instanced input primitive, etc.

(b) The priority function could also consider surface area of the children, number of primitives in the subtree, depth of the node in the object BVH, gain in area reduction when unbraiding the node, etc.

(c) The priority function could also consider the overlap of this node with other nodes (d) The unbraiding could be performed as a post-processing step of an existing top-level BVH. For instance, starting with an existing top-level BVH, the build algorithm could try to find overlapping nodes, and unbraid by inserting new nodes into the top-level tree.

(e) It could be helpful to perform the unbraiding only on those instances that have at least some overlap with other instances.

(f) A post-optimization could be performed that re-merges children in the top-level BVH that have the same transformation matrix.

In various embodiments, traversal variants can include one or more of:

(i) Top-level references to different sub-trees of the same object BVH may (e.g., all) use the same ray transformation during traversal. To avoid repeated transformations with the same transformation, the result of ray transforms could be cached in a memory/cache such as those discussed with reference to FIGS. 1 and/or 3-15.

(ii) The traversal might optimize special kind of transformations if the transformation type is stored in each instance node of the top-level BVH. The traversal can then check this type and implement special code paths for one or more of: the identity transformation, translations, rotations, scaling transformations, etc.

Figure 3:
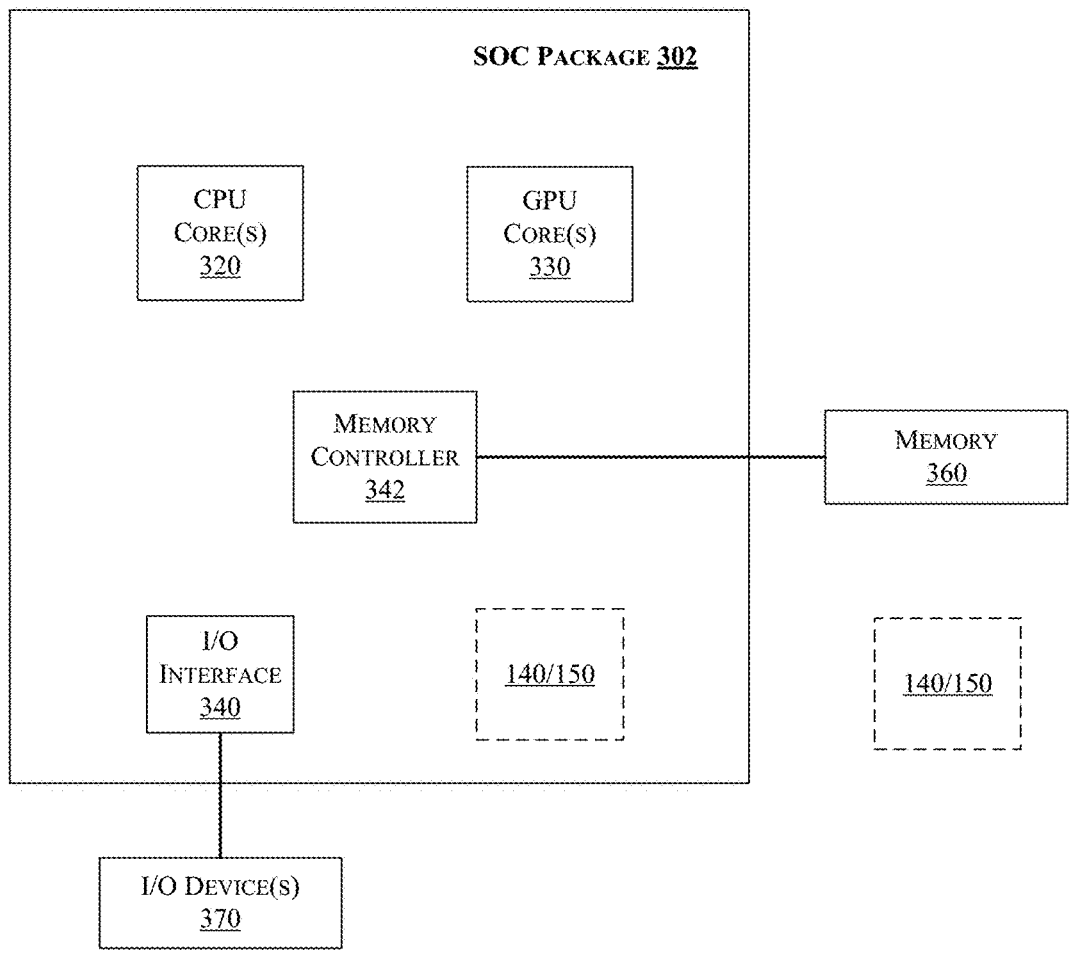

In some embodiments, one or more of the components discussed herein can be embodied as a System On Chip (SOC) device. FIG. 3 illustrates a block diagram of an SOC package in accordance with an embodiment. As illustrated in FIG. 3, SOC 302 includes one or more Central Processing Unit (CPU) cores 320 (which may be the same as or similar to the cores 106 of FIG. 1), one or more Graphics Processor Unit (GPU) cores 330 (which may be the same as or similar to the graphics logic 140 of FIG. 1), an Input/Output (I/O) interface 340, and a memory controller 342. Various components of the SOC package 302 may be coupled to an interconnect or bus such as discussed herein with reference to the other figures. Also, the SOC package 302 may include more or less components, such as those discussed herein with reference to the other figures. Further, each component of the SOC package 320 may include one or more other components, e.g., as discussed with reference to the other figures herein. In one embodiment, SOC package 302 (and its components) is provided on one or more Integrated Circuit (IC) die, e.g., which are packaged into a single semiconductor device.

As illustrated in FIG. 3, SOC package 302 is coupled to a memory 360 (which may be similar to or the same as memory discussed herein with reference to the other figures such as system memory 114 of FIG. 1) via the memory controller 342. In an embodiment, the memory 360 (or a portion of it) can be integrated on the SOC package 302.

The I/O interface 340 may be coupled to one or more I/O devices 370, e.g., via an interconnect and/or bus such as discussed herein with reference to other figures. I/O device(s) 370 may include one or more of a keyboard, a mouse, a touchpad, a display, an image/video capture device (such as a camera or camcorder/video recorder), a touch screen, a speaker, or the like. Furthermore, SOC package 302 may include/integrate the logic 140 and/or register(s) 150 (or a portion of the register(s) 150) in an embodiment. Alternatively, the logic 140 and/or register(s) 150 (or a portion of the register(s) 150) may be provided outside of the SOC package 302 (i.e., as a discrete logic).

Figure 4:
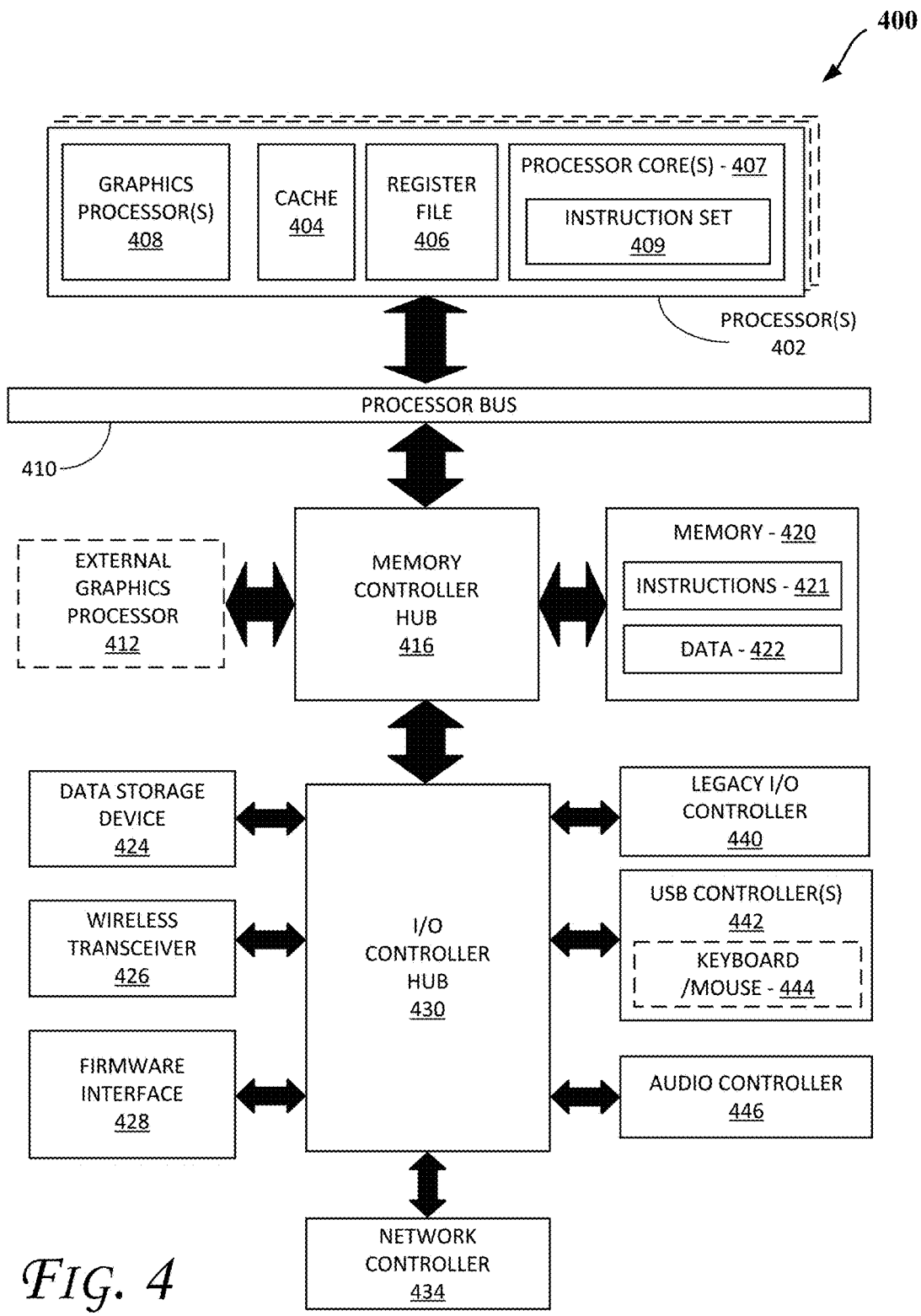

FIG. 4 is a block diagram of a processing system 400, according to an embodiment. In various embodiments the system 400 includes one or more processors 402 and one or more graphics processors 408 (such as the graphics logic 140 of FIG. 1), and may be a single processor desktop system, a multiprocessor workstation system, or a server system having a large number of processors 402 (such as processor 102 of FIG. 1) or processor cores 407 (such as cores 106 of FIG. 1). In on embodiment, the system 400 is a processing platform incorporated within a system-on-a-chip (SoC) integrated circuit for use in mobile, handheld, or embedded devices.

An embodiment of system 400 can include, or be incorporated within a server-based gaming platform, a game console, including a game and media console, a mobile gaming console, a handheld game console, or an online game console. In some embodiments system 400 is a mobile phone, smart phone, tablet computing device or mobile Internet device. Data processing system 400 can also include, couple with, or be integrated within a wearable device, such as a smart watch wearable device, smart eyewear device, augmented reality device, or virtual reality device. In some embodiments, data processing system 400 is a television or set top box device having one or more processors 402 and a graphical interface generated by one or more graphics processors 408.

In some embodiments, the one or more processors 402 each include one or more processor cores 407 to process instructions which, when executed, perform operations for system and user software. In some embodiments, each of the one or more processor cores 407 is configured to process a specific instruction set 409. In some embodiments, instruction set 409 may facilitate Complex Instruction Set Computing (CISC), Reduced Instruction Set Computing (RISC), or computing via a Very Long Instruction Word (VLIW). Multiple processor cores 407 may each process a different instruction set 409, which may include instructions to facilitate the emulation of other instruction sets. Processor core 407 may also include other processing devices, such a Digital Signal Processor (DSP).

In some embodiments, the processor 402 includes cache memory 404. Depending on the architecture, the processor 402 can have a single internal cache or multiple levels of internal cache. In some embodiments, the cache memory is shared among various components of the processor 402. In some embodiments, the processor 402 also uses an external cache (e.g., a Level-3 (L3) cache or Last Level Cache (LLC)) (not shown), which may be shared among processor cores 407 using known cache coherency techniques. A register file 406 is additionally included in processor 402 which may include different types of registers for storing different types of data (e.g., integer registers, floating point registers, status registers, and an instruction pointer register). Some registers may be general-purpose registers, while other registers may be specific to the design of the processor 402.

In some embodiments, processor 402 is coupled to a processor bus 410 to transmit communication signals such as address, data, or control signals between processor 402 and other components in system 400. In one embodiment the system 400 uses an exemplary 'hub' system architecture, including a memory controller hub 416 and an Input Output (I/O) controller hub 430. A memory controller hub 416 facilitates communication between a memory device and other components of system 400, while an I/O Controller Hub (ICH) 430 provides connections to I/O devices via a local I/O bus. In one embodiment, the logic of the memory controller hub 416 is integrated within the processor.

Memory device 420 can be a dynamic random access memory (DRAM) device, a static random access memory (SRAM) device, flash memory device, phase-change memory device, or some other memory device having suitable performance to serve as process memory. In one embodiment the memory device 420 can operate as system memory for the system 400, to store data 422 and instructions 421 for use when the one or more processors 402 executes an application or process. Memory controller hub 416 also couples with an optional external graphics processor 412, which may communicate with the one or more graphics processors 408 in processors 402 to perform graphics and media operations.

In some embodiments, ICH 430 enables peripherals to connect to memory device 420 and processor 402 via a high-speed I/O bus. The I/O peripherals include, but are not limited to, an audio controller 446, a firmware interface 428, a wireless transceiver 426 (e.g., Wi-Fi, Bluetooth), a data storage device 424 (e.g., hard disk drive, flash memory, etc.), and a legacy I/O controller 440 for coupling legacy (e.g., Personal System 2 (PS/2)) devices to the system. One or more Universal Serial Bus (USB) controllers 442 connect input devices, such as keyboard and mouse 444 combinations. A network controller 434 may also couple to ICH 430. In some embodiments, a high-performance network controller (not shown) couples to processor bus 410. It will be appreciated that the system 400 shown is exemplary and not limiting, as other types of data processing systems that are differently configured may also be used. For example, the I/O controller hub 430 may be integrated within the one or more processor 402, or the memory controller hub 416 and I/O controller hub 430 may be integrated into a discreet external graphics processor, such as the external graphics processor 412.

Figure 5:
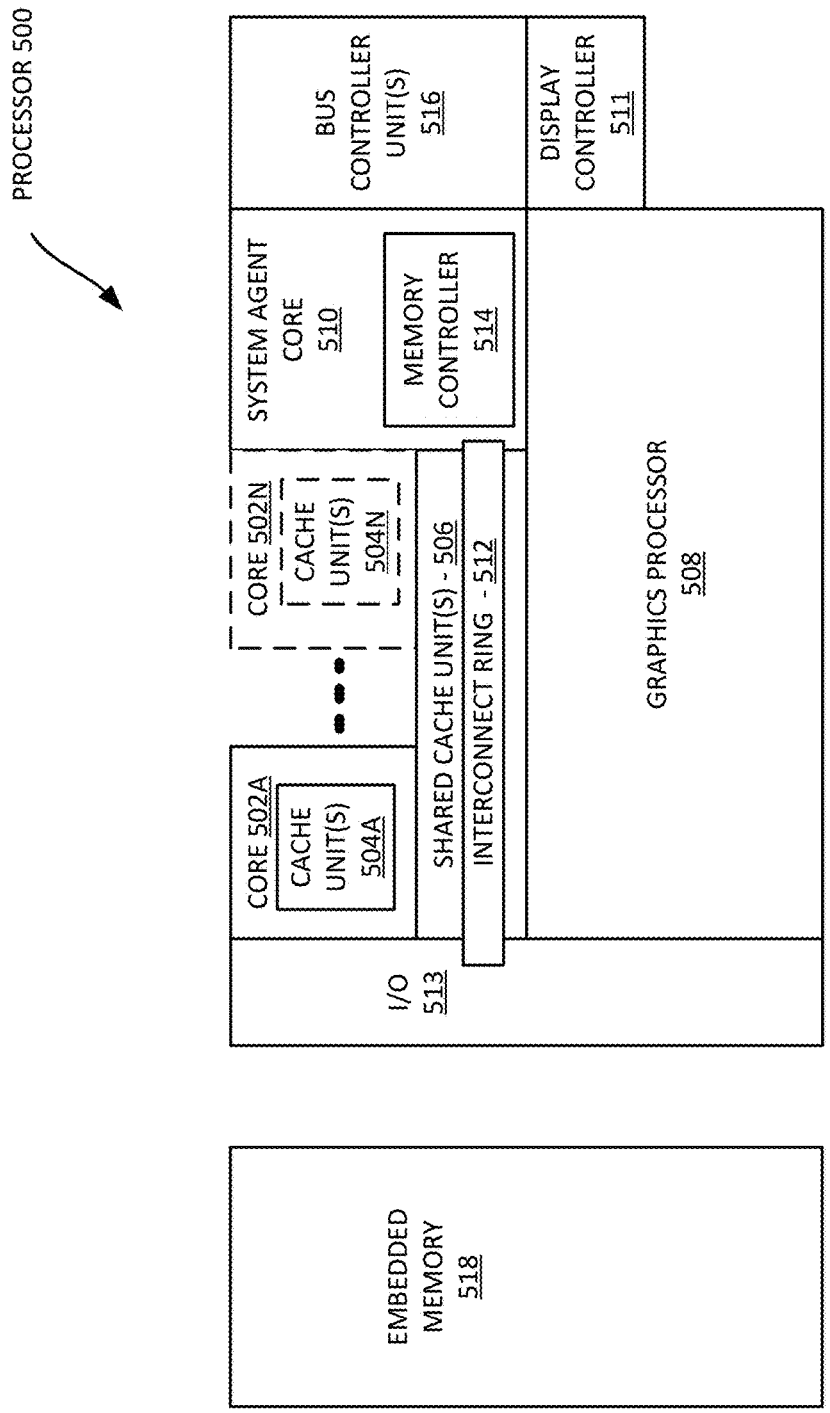
FIGS. 5-9 and 11 illustrate various components of processers in accordance with some embodiments.

FIG. 5 is a block diagram of an embodiment of a processor 500 having one or more processor cores 502A-502N, an integrated memory controller 514, and an integrated graphics processor 508. The processor 500 may be similar to or the same as the processor 102 discussed with reference to FIG. 1. Those elements of FIG. 5 having the same reference numbers (or names) as the elements of any other figure herein can operate or function in any manner similar to that described elsewhere herein, but are not limited to such. Processor 500 can include additional cores up to and including additional core 502N represented by the dashed lined boxes. Each of processor cores 502A-502N includes one or more internal cache units 504A-504N. In some embodiments each processor core also has access to one or more shared cached units 506.

The internal cache units 504A-504N and shared cache units 506 represent a cache memory hierarchy within the processor 500. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 506 and 504A-504N.

In some embodiments, processor 500 may also include a set of one or more bus controller units 516 and a system agent core 510. The one or more bus controller units 516 manage a set of peripheral buses, such as one or more Peripheral Component Interconnect buses (e.g., PCI, PCI Express). System agent core 510 provides management functionality for the various processor components. In some embodiments, system agent core 510 includes one or more integrated memory controllers 514 to manage access to various external memory devices (not shown).

In some embodiments, one or more of the processor cores 502A-502N include support for simultaneous multi-threading. In such embodiment, the system agent core 510 includes components for coordinating and operating cores 502A-502N during multi-threaded processing. System agent core 510 may additionally include a power control unit (PCU), which includes logic and components to regulate the power state of processor cores 502A-502N and graphics processor 508.

In some embodiments, processor 500 additionally includes graphics processor 508 to execute graphics processing operations. In some embodiments, the graphics processor 508 couples with the set of shared cache units 506, and the system agent core 510, including the one or more integrated memory controllers 514. In some embodiments, a display controller 511 is coupled with the graphics processor 508 to drive graphics processor output to one or more coupled displays. In some embodiments, display controller 511 may be a separate module coupled with the graphics processor via at least one interconnect, or may be integrated within the graphics processor 508 or system agent core 510.

In some embodiments, a ring based interconnect unit 512 is used to couple the internal components of the processor 500. However, an alternative interconnect unit may be used, such as a point-to-point interconnect, a switched interconnect, or other techniques, including techniques well known in the art. In some embodiments, graphics processor 508 couples with the ring interconnect 512 via an I/O link 513.

The exemplary I/O link 513 represents at least one of multiple varieties of I/O interconnects, including an on package I/O interconnect which facilitates communication between various processor components and a high-performance embedded memory module 518, such as an eDRAM (or embedded DRAM) module. In some embodiments, each of the processor cores 502-502N and graphics processor 508 use embedded memory modules 518 as a shared Last Level Cache.

In some embodiments, processor cores 502A-502N are homogenous cores executing the same instruction set architecture. In another embodiment, processor cores 502A-502N are heterogeneous in terms of instruction set architecture (ISA), where one or more of processor cores 502A-502N execute a first instruction set, while at least one of the other cores executes a subset of the first instruction set or a different instruction set. In one embodiment processor cores 502A-502N are heterogeneous in terms of microarchitecture, where one or more cores having a relatively higher power consumption couple with one or more power cores having a lower power consumption. Additionally, processor 500 can be implemented on one or more chips or as an SoC integrated circuit having the illustrated components, in addition to other components.

Figure 6:
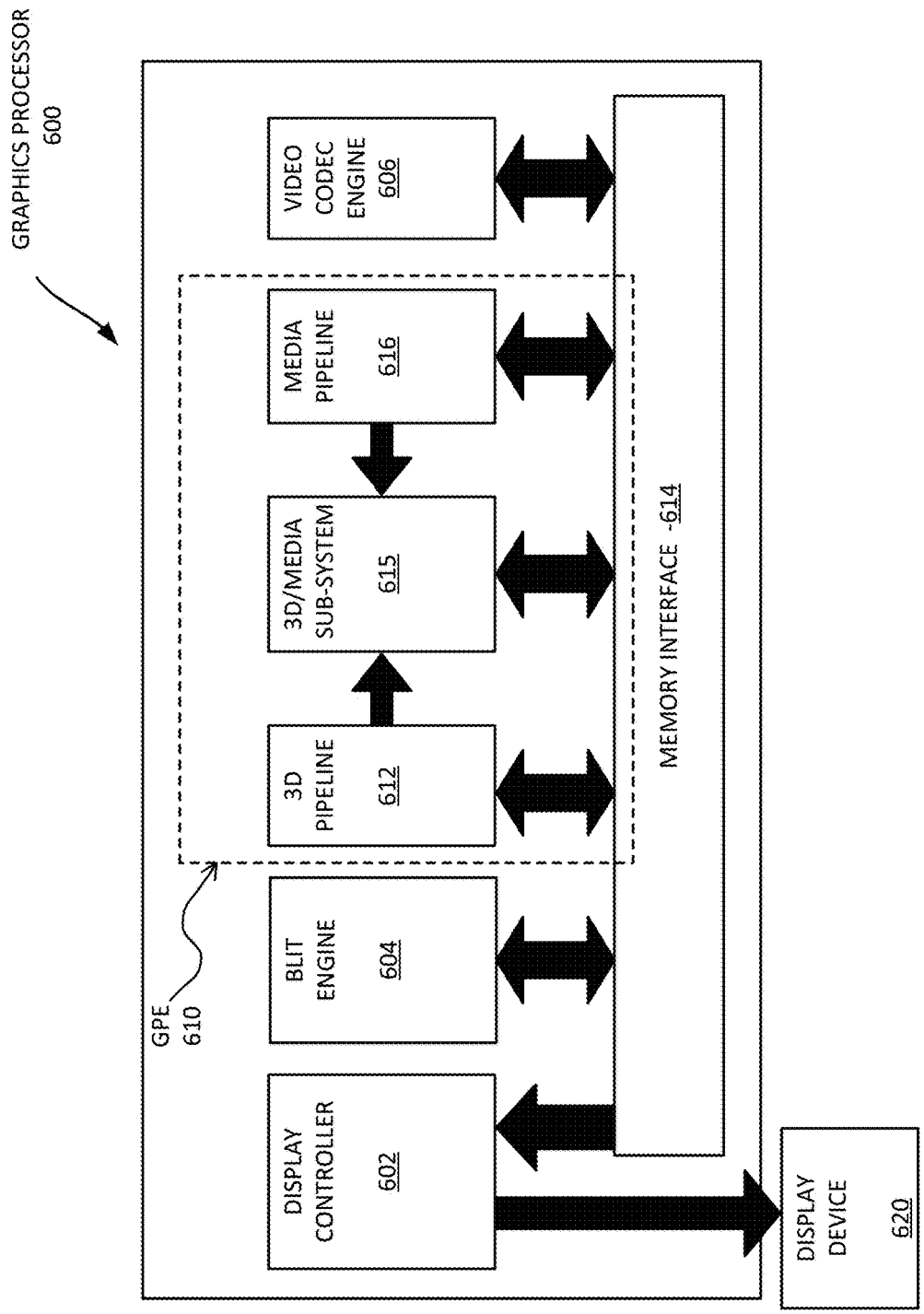

FIG. 6 is a block diagram of a graphics processor 600, which may be a discrete graphics processing unit, or may be a graphics processor integrated with a plurality of processing cores. The graphics processor 600 may be similar to or the same as the graphics logic 140 discussed with reference to FIG. 1. In some embodiments, the graphics processor communicates via a memory mapped I/O interface to registers on the graphics processor and with commands placed into the processor memory. In some embodiments, graphics processor 600 includes a memory interface 614 to access memory. Memory interface 614 can be an interface to local memory, one or more internal caches, one or more shared external caches, and/or to system memory.

In some embodiments, graphics processor 600 also includes a display controller 602 to drive display output data to a display device 620. Display controller 602 includes hardware for one or more overlay planes for the display and composition of multiple layers of video or user interface elements. In some embodiments, graphics processor 600 includes a video codec engine 606 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 600 includes a block image transfer (BLIT) engine 604 to perform two-dimensional (2D) rasterizer operations including, for example, bit-boundary block transfers. However, in one embodiment, 2D graphics operations are performed using one or more components of graphics processing engine (GPE) 610. In some embodiments, graphics processing engine 610 is a compute engine for performing graphics operations, including three-dimensional (3D) graphics operations and media operations.

In some embodiments, GPE 610 includes a 3D pipeline 612 for performing 3D operations, such as rendering three-dimensional images and scenes using processing functions that act upon 3D primitive shapes (e.g., rectangle, triangle, etc.). The 3D pipeline 612 includes programmable and fixed function elements that perform various tasks within the element and/or spawn execution threads to a 3D/Media sub-system 615. While 3D pipeline 612 can be used to perform media operations, an embodiment of GPE 610 also includes a media pipeline 616 that is specifically used to perform media operations, such as video post-processing and image enhancement.

In some embodiments, media pipeline 616 includes fixed function or programmable logic units to perform one or more specialized media operations, such as video decode acceleration, video de-interlacing, and video encode acceleration in place of, or on behalf of video codec engine 606. In some embodiments, media pipeline 616 additionally includes a thread spawning unit to spawn threads for execution on 3D/Media sub-system 615. The spawned threads perform computations for the media operations on one or more graphics execution units included in 3D/Media subsystem 615.

In some embodiments, 3D/Media subsystem 615 includes logic for executing threads spawned by 3D pipeline 612 and media pipeline 616. In one embodiment, the pipelines send thread execution requests to 3D/Media subsystem 615, which includes thread dispatch logic for arbitrating and dispatching the various requests to available thread execution resources. The execution resources include an array of graphics execution units to process the 3D and media threads. In some embodiments, 3D/Media subsystem 615 includes one or more internal caches for thread instructions and data. In some embodiments, the subsystem also includes shared memory, including registers and addressable memory, to share data between threads and to store output data.

Figure 7:
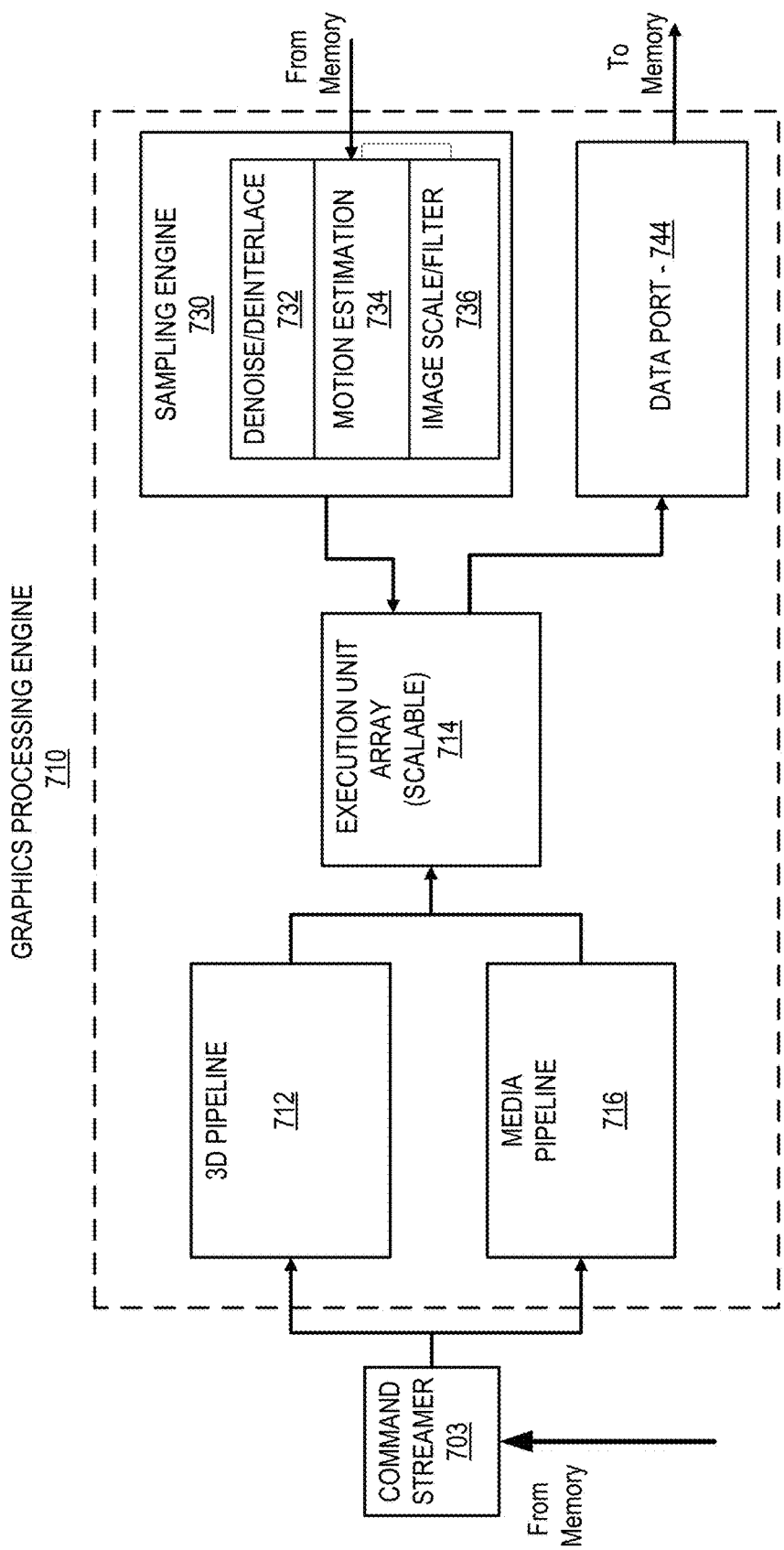

FIG. 7 is a block diagram of a graphics processing engine 710 of a graphics processor in accordance with some embodiments. In one embodiment, the GPE 710 is a version of the GPE 610 shown in FIG. 6. Elements of FIG. 7 having the same reference numbers (or names) as the elements of any other figure herein can operate or function in any manner similar to that described elsewhere herein, but are not limited to such.

In some embodiments, GPE 710 couples with a command streamer 703, which provides a command stream to the GPE 3D and media pipelines 712, 716. In some embodiments, command streamer 703 is coupled to memory, which can be system memory, or one or more of internal cache memory and shared cache memory. In some embodiments, command streamer 703 receives commands from the memory and sends the commands to 3D pipeline 712 and/or media pipeline 716. The commands are directives fetched from a ring buffer, which stores commands for the 3D and media pipelines 712, 716. In one embodiment, the ring buffer can additionally include batch command buffers storing batches of multiple commands. The 3D and media pipelines 712, 716 process the commands by performing operations via logic within the respective pipelines or by dispatching one or more execution threads to an execution unit array 714. In some embodiments, execution unit array 714 is scalable, such that the array includes a variable number of execution units based on the target power and performance level of GPE 710.

In some embodiments, a sampling engine 730 couples with memory (e.g., cache memory or system memory) and execution unit array 714. In some embodiments, sampling engine 730 provides a memory access mechanism for execution unit array 714 that allows execution array 714 to read graphics and media data from memory. In some embodiments, sampling engine 730 includes logic to perform specialized image sampling operations for media.

In some embodiments, the specialized media sampling logic in sampling engine 730 includes a de-noise/de-interlace module 732, a motion estimation module 734, and an image scaling and filtering module 736. In some embodiments, de-noise/de-interlace module 732 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 732 includes dedicated motion detection logic (e.g., within the motion estimation engine 734).

In some embodiments, motion estimation engine 734 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 734 to perform operations on video at the macro-block level that may otherwise be too computationally intensive to perform with a general-purpose processor. In some embodiments, motion estimation engine 734 is generally available to graphics processor components to assist with video decode and processing functions that are sensitive or adaptive to the direction or magnitude of the motion within video data.

In some embodiments, image scaling and filtering module 736 performs image-processing operations to enhance the visual quality of generated images and video. In some embodiments, scaling and filtering module 736 processes image and video data during the sampling operation before providing the data to execution unit array 714.

In some embodiments, the GPE 710 includes a data port 744, which provides an additional mechanism for graphics subsystems to access memory. In some embodiments, data port 744 facilitates memory access for operations including render target writes, constant buffer reads, scratch memory space reads/writes, and media surface accesses. In some embodiments, data port 744 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 714 communicate with the data port by exchanging messages via a data distribution interconnect that couples each of the sub-systems of GPE 710.

Figure 8:
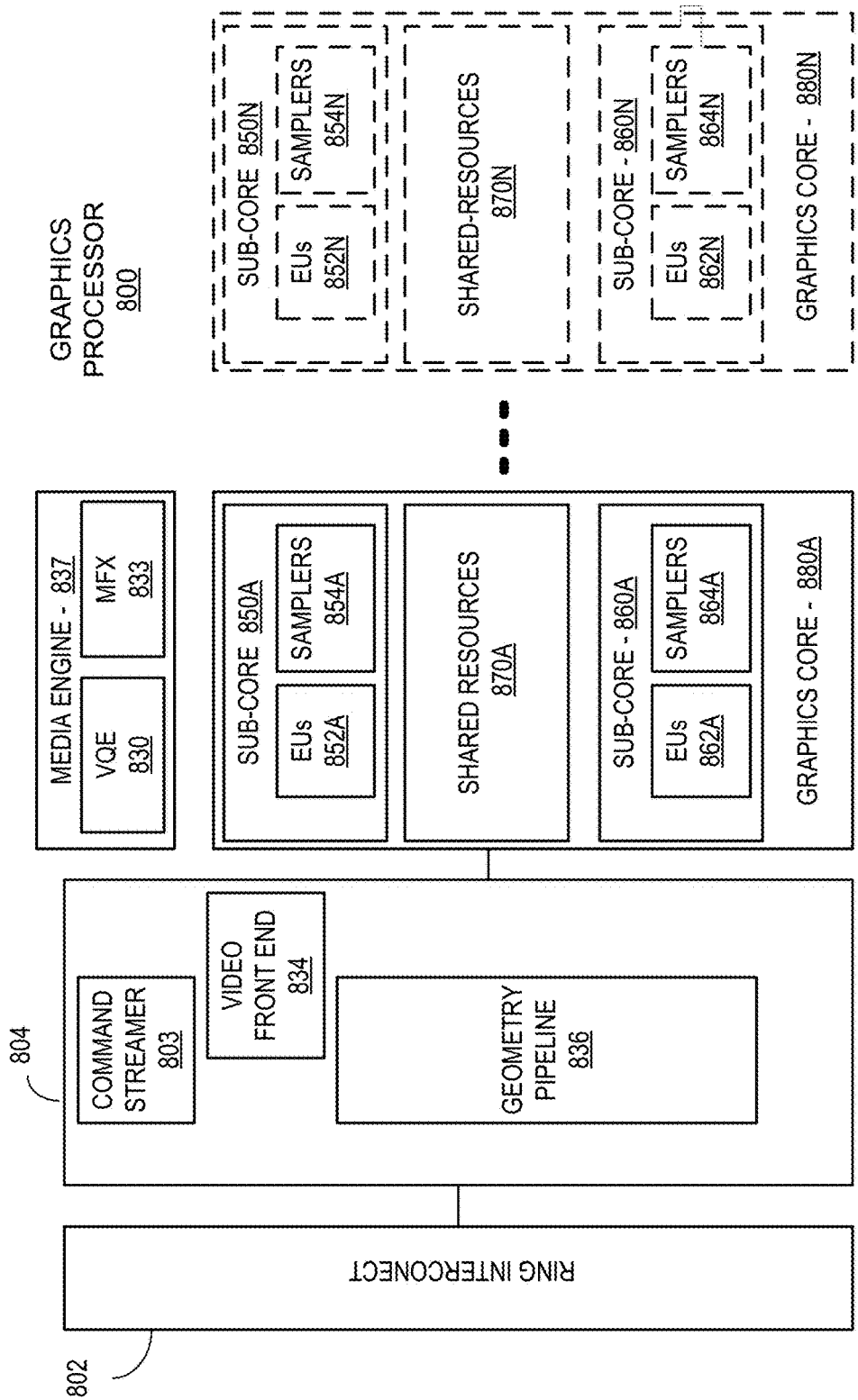

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a ring interconnect 802, a pipeline front-end 804, a media engine 837, and graphics cores 880A-880N. In some embodiments, ring interconnect 802 couples the graphics processor to other processing units, including other graphics processors or one or more general-purpose processor cores.

In some embodiments, the graphics processor is one of many processors integrated within a multi-core processing system.

In some embodiments, graphics processor 800 receives batches of commands via ring interconnect 802. The incoming commands are interpreted by a command streamer 803 in the pipeline front-end 804. In some embodiments, graphics processor 800 includes scalable execution logic to perform 3D geometry processing and media processing via the graphics core(s) 880A-880N. For 3D geometry processing commands, command streamer 803 supplies commands to geometry pipeline 836. For at least some media processing commands, command streamer 803 supplies the commands to a video front end 834, which couples with a media engine 837. In some embodiments, media engine 837 includes a Video Quality Engine (VQE) 830 for video and image post-processing and a multi-format encode/decode (MFX) 833 engine to provide hardware-accelerated media data encode and decode. In some embodiments, geometry pipeline 836 and media engine 837 each generate execution threads for the thread execution resources provided by at least one graphics core 880A.

In some embodiments, graphics processor 800 includes scalable thread execution resources featuring modular cores 880A-880N (sometimes referred to as core slices), each having multiple sub-cores 850A-850N, 860A-860N (sometimes referred to as core sub-slices). In some embodiments, graphics processor 800 can have any number of graphics cores 880A through 880N. In some embodiments, graphics processor 800 includes a graphics core 880A having at least a first sub-core 850A and a second core sub-core 860A. In other embodiments, the graphics processor is a low power processor with a single sub-core (e.g., 850A). In some embodiments, graphics processor 800 includes multiple graphics cores 880A-880N, each including a set of first sub-cores 850A-850N and a set of second sub-cores 860A-860N. Each sub-core in the set of first sub-cores 850A-850N includes at least a first set of execution units 852A-852N and media/texture samplers 854A-854N. Each sub-core in the set of second sub-cores 860A-860N includes at least a second set of execution units 862A-862N and samplers 864A-864N. In some embodiments, each sub-core 850A-850N, 860A-860N shares a set of shared resources 870A-870N. In some embodiments, the shared resources include shared cache memory and pixel operation logic. Other shared resources may also be included in the various embodiments of the graphics processor.

Figure 9:
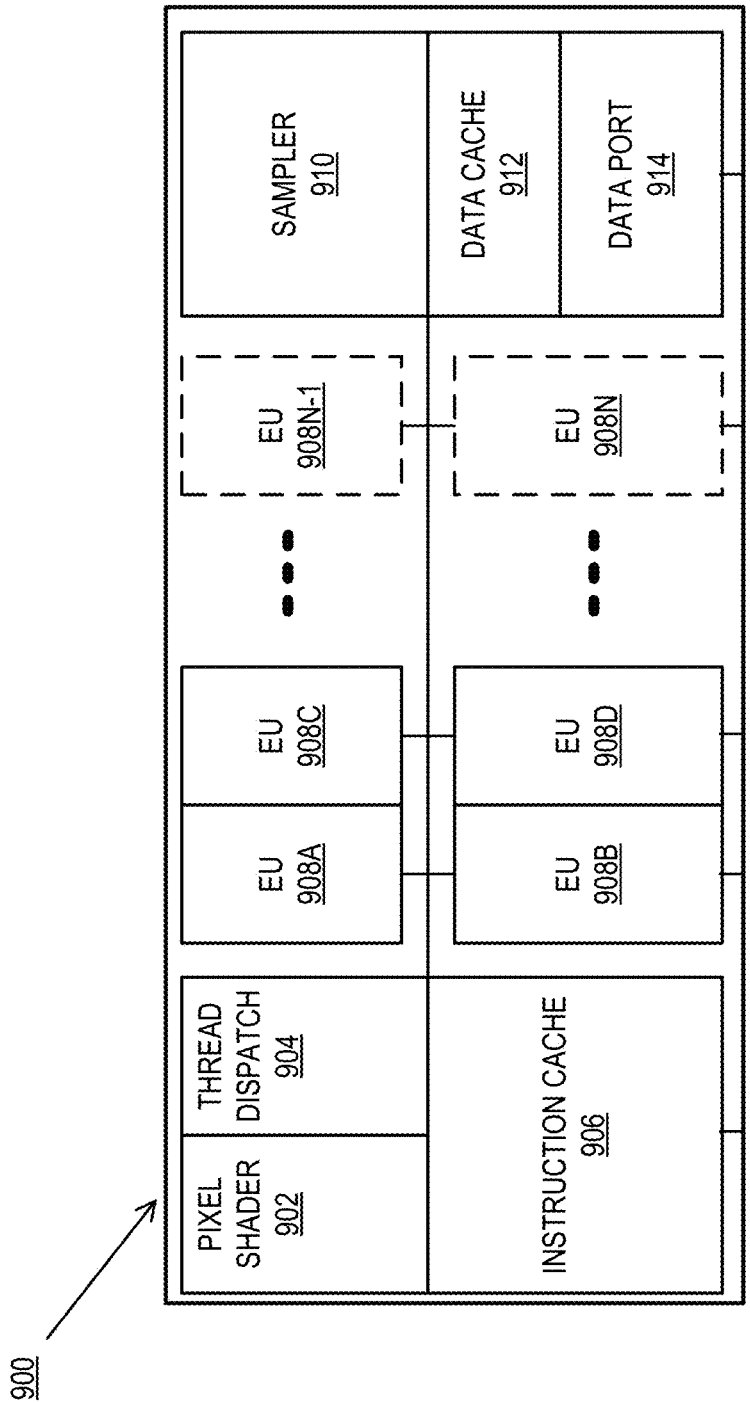

FIG. 9 illustrates thread execution logic 900 including an array of processing elements employed in some embodiments of a GPE. Elements of FIG. 9 having the same reference numbers (or names) as the elements of any other figure herein can operate or function in any manner similar to that described elsewhere herein, but are not limited to such.

In some embodiments, thread execution logic 900 includes a pixel shader 902, a thread dispatcher 904, instruction cache 906, a scalable execution unit array including a plurality of execution units 908A-908N, a sampler 910, a data cache 912, and a data port 914. In one embodiment the included components are interconnected via an interconnect fabric that links to each of the components. In some embodiments, thread execution logic 900 includes one or more connections to memory, such as system memory or cache memory, through one or more of instruction cache 906, data port 914, sampler 910, and execution unit array 908A-908N. In some embodiments, each execution unit (e.g., 908A) is an individual vector processor capable of executing multiple simultaneous threads and processing multiple data elements in parallel for each thread. In some embodiments, execution unit array 908A-908N includes any number individual execution units.

In some embodiments, execution unit array 908A-908N is primarily used to execute "shader" programs. In some embodiments, the execution units in array 908A-908N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 908A-908N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 908A-908N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 906) are included in the thread execution logic 900 to cache thread instructions for the execution units. In some embodiments, one or more data caches (e.g., 912) are included to cache thread data during thread execution. In some embodiments, sampler 910 is included to provide texture sampling for 3D operations and media sampling for media operations. In some embodiments, sampler 910 includes specialized texture or media sampling functionality to process texture or media data during the sampling process before providing the sampled data to an execution unit.

During execution, the graphics and media pipelines send thread initiation requests to thread execution logic 900 via thread spawning and dispatch logic. In some embodiments, thread execution logic 900 includes a local thread dispatcher 904 that arbitrates thread initiation requests from the graphics and media pipelines and instantiates the requested threads on one or more execution units 908A-908N. For example, the geometry pipeline (e.g., 836 of FIG. 8) dispatches vertex processing, tessellation, or geometry processing threads to thread execution logic 900 (FIG. 9). In some embodiments, thread dispatcher 904 can also process runtime thread spawning requests from the executing shader programs.

Once a group of geometric objects has been processed and rasterized into pixel data, pixel shader 902 is invoked to further compute output information and cause results to be written to output surfaces (e.g., color buffers, depth buffers, stencil buffers, etc.). In some embodiments, pixel shader 902 calculates the values of the various vertex attributes that are to be interpolated across the rasterized object. In some embodiments, pixel shader 902 then executes an application programming interface (API)-supplied pixel shader program. To execute the pixel shader program, pixel shader 902 dispatches threads to an execution unit (e.g., 908A) via thread dispatcher 904. In some embodiments, pixel shader 902 uses texture sampling logic in sampler 910 to access texture data in texture maps stored in memory. Arithmetic operations on the texture data and the input geometry data compute pixel color data for each geometric fragment, or discards one or more pixels from further processing.

In some embodiments, the data port 914 provides a memory access mechanism for the thread execution logic 900 output processed data to memory for processing on a graphics processor output pipeline. In some embodiments, the data port 914 includes or couples to one or more cache memories (e.g., data cache 912) to cache data for memory access via the data port.

Figure 10:
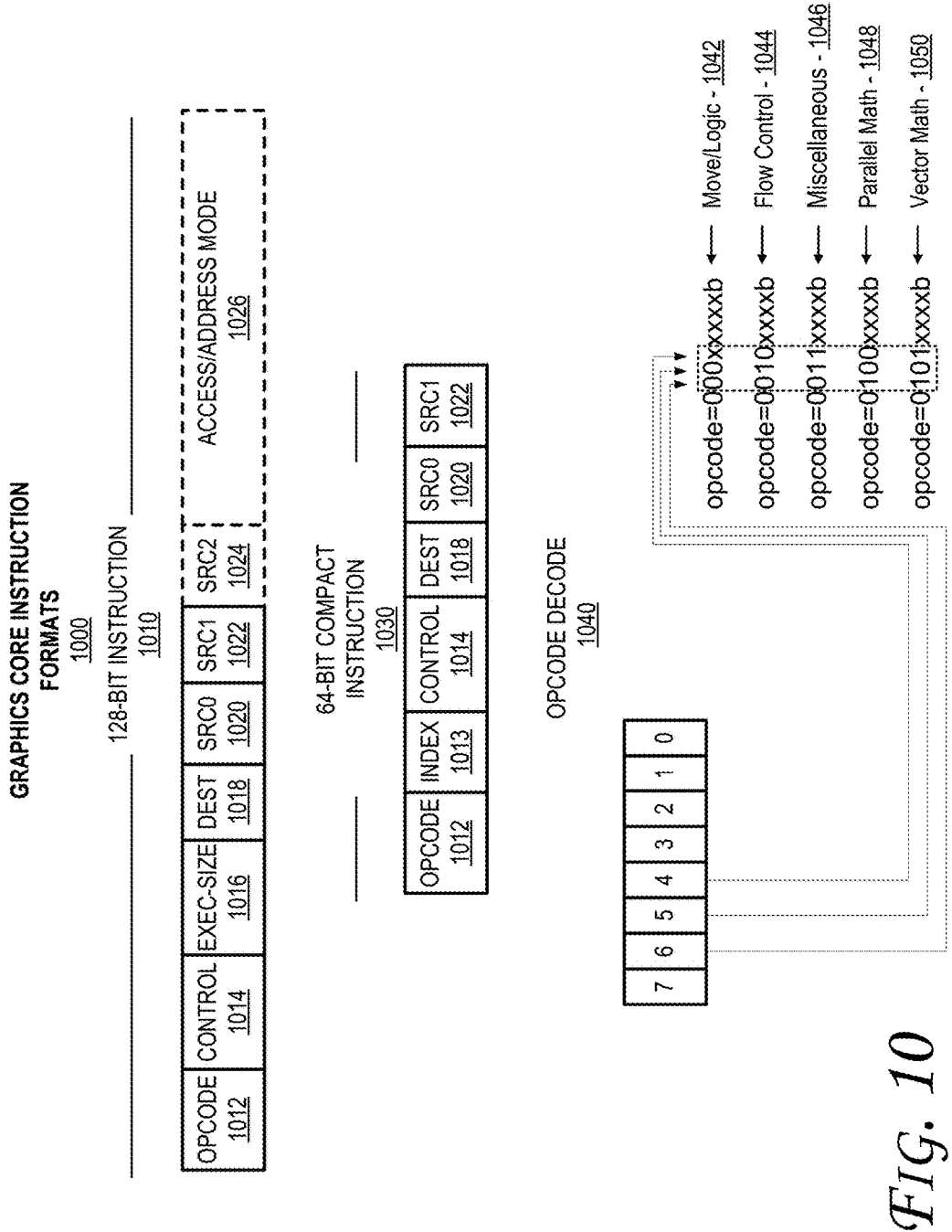
FIG. 10 illustrates graphics core instruction formats, according to some embodiments.

FIG. 10 is a block diagram illustrating a graphics processor instruction formats 1000 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 1000 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 1010. A 64-bit compacted instruction format 1030 is available for some instructions based on the selected instruction, instruction options, and number of operands. The native 128-bit format 1010 provides access to all instruction options, while some options and operations are restricted in the 64-bit format 1030. The native instructions available in the 64-bit format 1030 vary by embodiment. In some embodiments, the instruction is compacted in part using a set of index values in an index field 1013. The execution unit hardware references a set of compaction tables based on the index values and uses the compaction table outputs to reconstruct a native instruction in the 128-bit format 1010.

For each format, instruction opcode 1012 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 1014 enables control over certain execution options, such as channels selection (e.g., predication) and data channel order (e.g., swizzle). For 128-bit instructions 1010 an exec-size field 1016 limits the number of data channels that will be executed in parallel. In some embodiments, exec-size field 1016 is not available for use in the 64-bit compact instruction format 1030.

Some execution unit instructions have up to three operands including two source operands, src0 1022, src1 1022, and one destination 1018. In some embodiments, the execution units support dual destination instructions, where one of the destinations is implied. Data manipulation instructions can have a third source operand (e.g., SRC2 1024), where the instruction opcode 1012 determines the number of source operands. An instruction's last source operand can be an immediate (e.g., hard-coded) value passed with the instruction.

In some embodiments, the 128-bit instruction format 1010 includes an access/address mode information 1026 specifying, for example, whether direct register addressing mode or indirect register addressing mode is used. When direct register addressing mode is used, the register address of one or more operands is directly provided by bits in the instruction 1010.

In some embodiments, the 128-bit instruction format 1010 includes an access/address mode field 1026, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 1010 may use byte-aligned addressing for source and destination operands and when in a second mode, the instruction 1010 may use 16-byte-aligned addressing for all source and destination operands.

In one embodiment, the address mode portion of the access/address mode field 1026 determines whether the instruction is to use direct or indirect addressing. When direct register addressing mode is used bits in the instruction 1010 directly provide the register address of one or more operands. When indirect register addressing mode is used, the register address of one or more operands may be computed based on an address register value and an address immediate field in the instruction.

In some embodiments instructions are grouped based on opcode 1012 bit-fields to simplify Opcode decode 1040. For an 8-bit opcode, bits 10, 11, and 12 allow the execution unit to determine the type of opcode. The precise opcode grouping shown is merely an example. In some embodiments, a move and logic opcode group 1042 includes data movement and logic instructions (e.g., move (mov), compare (cmp)). In some embodiments, move and logic group 1042 shares the five most significant bits (MSB), where move (mov) instructions are in the form of 0000xxxxb and logic instructions are in the form of 0001xxxxb. A flow control instruction group 1044 (e.g., call, jump (jmp)) includes instructions in the form of 0010xxxxb (e.g., 0x20). A miscellaneous instruction group 1046 includes a mix of instructions, including synchronization instructions (e.g., wait, send) in the form of 0011xxxxb (e.g., 0x30). A parallel math instruction group 1048 includes component-wise arithmetic instructions (e.g., add, multiply (mul)) in the form of 0100xxxxb (e.g., 0x40). The parallel math group 1048 performs the arithmetic operations in parallel across data channels. The vector math group 1050 includes arithmetic instructions (e.g., dp4) in the form of 0101xxxxb (e.g., 0x50). The vector math group performs arithmetic such as dot product calculations on vector operands.

Figure 11:
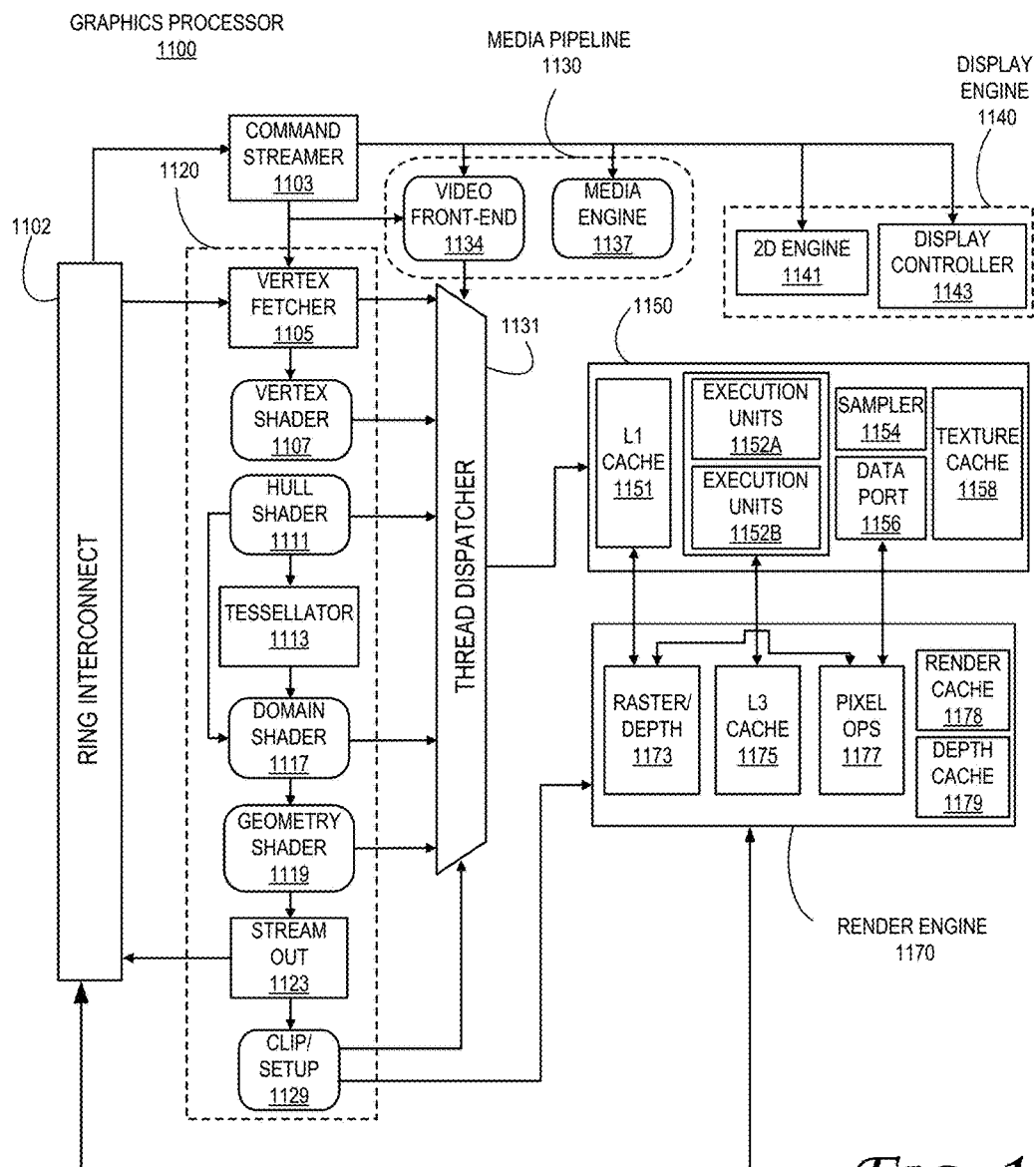

FIG. 11 is a block diagram of another embodiment of a graphics processor 1100. Elements of FIG. 11 having the same reference numbers (or names) as the elements of any other figure herein can operate or function in any manner similar to that described elsewhere herein, but are not limited to such.

In some embodiments, graphics processor 1100 includes a graphics pipeline 1120, a media pipeline 1130, a display engine 1140, thread execution logic 1150, and a render output pipeline 1170. In some embodiments, graphics processor 1100 is a graphics processor within a multi-core processing system that includes one or more general purpose processing cores. The graphics processor is controlled by register writes to one or more control registers (not shown) or via commands issued to graphics processor 1100 via a ring interconnect 1102. In some embodiments, ring interconnect 1102 couples graphics processor 1100 to other processing components, such as other graphics processors or general-purpose processors. Commands from ring interconnect 1102 are interpreted by a command streamer 1103, which supplies instructions to individual components of graphics pipeline 1120 or media pipeline 1130.

In some embodiments, command streamer 1103 directs the operation of a vertex fetcher 1105 that reads vertex data from memory and executes vertex-processing commands provided by command streamer 1103. In some embodiments, vertex fetcher 1105 provides vertex data to a vertex shader 1107, which performs coordinate space transformation and lighting operations to each vertex. In some embodiments, vertex fetcher 1105 and vertex shader 1107 execute vertex-processing instructions by dispatching execution threads to execution units 1152A, 1152B via a thread dispatcher 1131.

In some embodiments, execution units 1152A, 1152B are an array of vector processors having an instruction set for performing graphics and media operations. In some embodiments, execution units 1152A, 1152B have an attached L1 cache 1151 that is specific for each array or shared between the arrays. The cache can be configured as a data cache, an instruction cache, or a single cache that is partitioned to contain data and instructions in different partitions.

In some embodiments, graphics pipeline 1120 includes tessellation components to perform hardware-accelerated tessellation of 3D objects. In some embodiments, a programmable hull shader 1111 configures the tessellation operations. A programmable domain shader 1117 provides back-end evaluation of tessellation output. A tessellator 1113 operates at the direction of hull shader 1111 and contains special purpose logic to generate a set of detailed geometric objects based on a coarse geometric model that is provided as input to graphics pipeline 1120. In some embodiments, if tessellation is not used, tessellation components 1111, 1113, 1117 can be bypassed.

In some embodiments, complete geometric objects can be processed by a geometry shader 1119 via one or more threads dispatched to execution units 1152A, 1152B, or can proceed directly to the clipper 1129. In some embodiments, the geometry shader operates on entire geometric objects, rather than vertices or patches of vertices as in previous stages of the graphics pipeline. If the tessellation is disabled the geometry shader 1119 receives input from the vertex shader 1107. In some embodiments, geometry shader 1119 is programmable by a geometry shader program to perform geometry tessellation if the tessellation units are disabled.

Before rasterization, a clipper 1129 processes vertex data. The clipper 1129 may be a fixed function clipper or a programmable clipper having clipping and geometry shader functions. In some embodiments, a rasterizer/depth 1173 in the render output pipeline 1170 dispatches pixel shaders to convert the geometric objects into their per pixel representations. In some embodiments, pixel shader logic is included in thread execution logic 1150. In some embodiments, an application can bypass the rasterizer 1173 and access unrasterized vertex data via a stream out unit 1123.

The graphics processor 1100 has an interconnect bus, interconnect fabric, or some other interconnect mechanism that allows data and message passing amongst the major components of the processor. In some embodiments, execution units 1152A, 1152B and associated cache(s) 1151, texture and media sampler 1154, and texture/sampler cache 1158 interconnect via a data port 1156 to perform memory access and communicate with render output pipeline components of the processor. In some embodiments, sampler 1154, caches 1151, 1158 and execution units 1152A, 1152B each have separate memory access paths.

In some embodiments, render output pipeline 1170 contains a rasterizer and depth test component 1173 that converts vertex-based objects into an associated pixel-based representation. In some embodiments, the rasterizer logic includes a windower/masker unit to perform fixed function triangle and line rasterization. An associated render cache 1178 and depth cache 1179 are also available in some embodiments. A pixel operations component 1177 performs pixel-based operations on the data, though in some instances, pixel operations associated with 2D operations (e.g., bit block image transfers with blending) are performed by the 2D engine 1141, or substituted at display time by the display controller 1143 using overlay display planes. In some embodiments, a shared L3 cache 1175 is available to all graphics components, allowing the sharing of data without the use of main system memory.

In some embodiments, graphics processor media pipeline 1130 includes a media engine 1137 and a video front end 1134. In some embodiments, video front end 1134 receives pipeline commands from the command streamer 1103. In some embodiments, media pipeline 1130 includes a separate command streamer. In some embodiments, video front-end 1134 processes media commands before sending the command to the media engine 1137. In some embodiments, media engine 1137 includes thread spawning functionality to spawn threads for dispatch to thread execution logic 1150 via thread dispatcher 1131.

In some embodiments, graphics processor 1100 includes a display engine 1140. In some embodiments, display engine 1140 is external to processor 1100 and couples with the graphics processor via the ring interconnect 1102, or some other interconnect bus or fabric. In some embodiments, display engine 1140 includes a 2D engine 1141 and a display controller 1143. In some embodiments, display engine 1140 contains special purpose logic capable of operating independently of the 3D pipeline. In some embodiments, display controller 1143 couples with a display device (not shown), which may be a system integrated display device, as in a laptop computer, or an external display device attached via a display device connector.

In some embodiments, graphics pipeline 1120 and media pipeline 1130 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

FIG. 12A is a block diagram illustrating a graphics processor command format 1200 according to some embodiments. FIG. 12B is a block diagram illustrating a graphics processor command sequence 1210 according to an embodiment. The solid lined boxes in FIG. 12A illustrate the components that are generally included in a graphics command while the dashed lines include components that are optional or that are only included in a sub-set of the graphics commands. The exemplary graphics processor command format 1200 of FIG. 12A includes data fields to identify a target client 1202 of the command, a command operation code (opcode) 1204, and the relevant data 1206 for the command. A sub-opcode 1205 and a command size 1208 are also included in some commands.

In some embodiments, client 1202 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 1204 and, if present, sub-opcode 1205 to determine the operation to perform. The client unit performs the command using information in data field 1206. For some commands an explicit command size 1208 is expected to specify the size of the command. In some embodiments, the command parser automatically determines the size of at least some of the commands based on the command opcode. In some embodiments commands are aligned via multiples of a double word.

The flow diagram in FIG. 12B shows an exemplary graphics processor command sequence 1210. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 1210 may begin with a pipeline flush command 1212 to cause any active graphics pipeline to complete the currently pending commands for the pipeline. In some embodiments, the 3D pipeline 1222 and the media pipeline 1224 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 1212 can be used for pipeline synchronization or before placing the graphics processor into a low power state.

In some embodiments, a pipeline select command 1213 is used when a command sequence requires the graphics processor to explicitly switch between pipelines. In some embodiments, a pipeline select command 1213 is required only once within an execution context before issuing pipeline commands unless the context is to issue commands for both pipelines. In some embodiments, a pipeline flush command is 1212 is required immediately before a pipeline switch via the pipeline select command 1213.

In some embodiments, a pipeline control command 1214 configures a graphics pipeline for operation and is used to program the 3D pipeline 1222 and the media pipeline 1224. In some embodiments, pipeline control command 1214 configures the pipeline state for the active pipeline. In one embodiment, the pipeline control command 1214 is used for pipeline synchronization and to clear data from one or more cache memories within the active pipeline before processing a batch of commands.

In some embodiments, return buffer state commands 1216 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 1216 includes selecting the size and number of return buffers to use for a set of pipeline operations.

The remaining commands in the command sequence differ based on the active pipeline for operations. Based on a pipeline determination 1220, the command sequence is tailored to the 3D pipeline 1222 beginning with the 3D pipeline state 1230, or the media pipeline 1224 beginning at the media pipeline state 1240.

The commands for the 3D pipeline state 1230 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 1230 commands are also able to selectively disable or bypass certain pipeline elements if those elements will not be used.

In some embodiments, 3D primitive 1232 command is used to submit 3D primitives to be processed by the 3D pipeline. Commands and associated parameters that are passed to the graphics processor via the 3D primitive 1232 command are forwarded to the vertex fetch function in the graphics pipeline. The vertex fetch function uses the 3D primitive 1232 command data to generate vertex data structures. The vertex data structures are stored in one or more return buffers. In some embodiments, 3D primitive 1232 command is used to perform vertex operations on 3D primitives via vertex shaders. To process vertex shaders, 3D pipeline 1222 dispatches shader execution threads to graphics processor execution units.

In some embodiments, 3D pipeline 1222 is triggered via an execute 1234 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 1210 follows the media pipeline 1224 path when performing media operations. In general, the specific use and manner of programming for the media pipeline 1224 depends on the media or compute operations to be performed. Specific media decode operations may be offloaded to the media pipeline during media decode. In some embodiments, the media pipeline can also be bypassed and media decode can be performed in whole or in part using resources provided by one or more general purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 1224 is configured in a similar manner as the 3D pipeline 1222. A set of media pipeline state commands 1240 are dispatched or placed into in a command queue before the media object commands 1242. In some embodiments, media pipeline state commands 1240 include data to configure the media pipeline elements that will be used to process the media objects. This includes data to configure the video decode and video encode logic within the media pipeline, such as encode or decode format. In some embodiments, media pipeline state commands 1240 also support the use one or more pointers to "indirect" state elements that contain a batch of state settings.

In some embodiments, media object commands 1242 supply pointers to media objects for processing by the media pipeline. The media objects include memory buffers containing video data to be processed. In some embodiments, all media pipeline states must be valid before issuing a media object command 1242. Once the pipeline state is configured and media object commands 1242 are queued, the media pipeline 1224 is triggered via an execute command 1244 or an equivalent execute event (e.g., register write). Output from media pipeline 1224 may then be post processed by operations provided by the 3D pipeline 1222 or the media pipeline 1224. In some embodiments, GPGPU operations are configured and executed in a similar manner as media operations.

Figure 13:
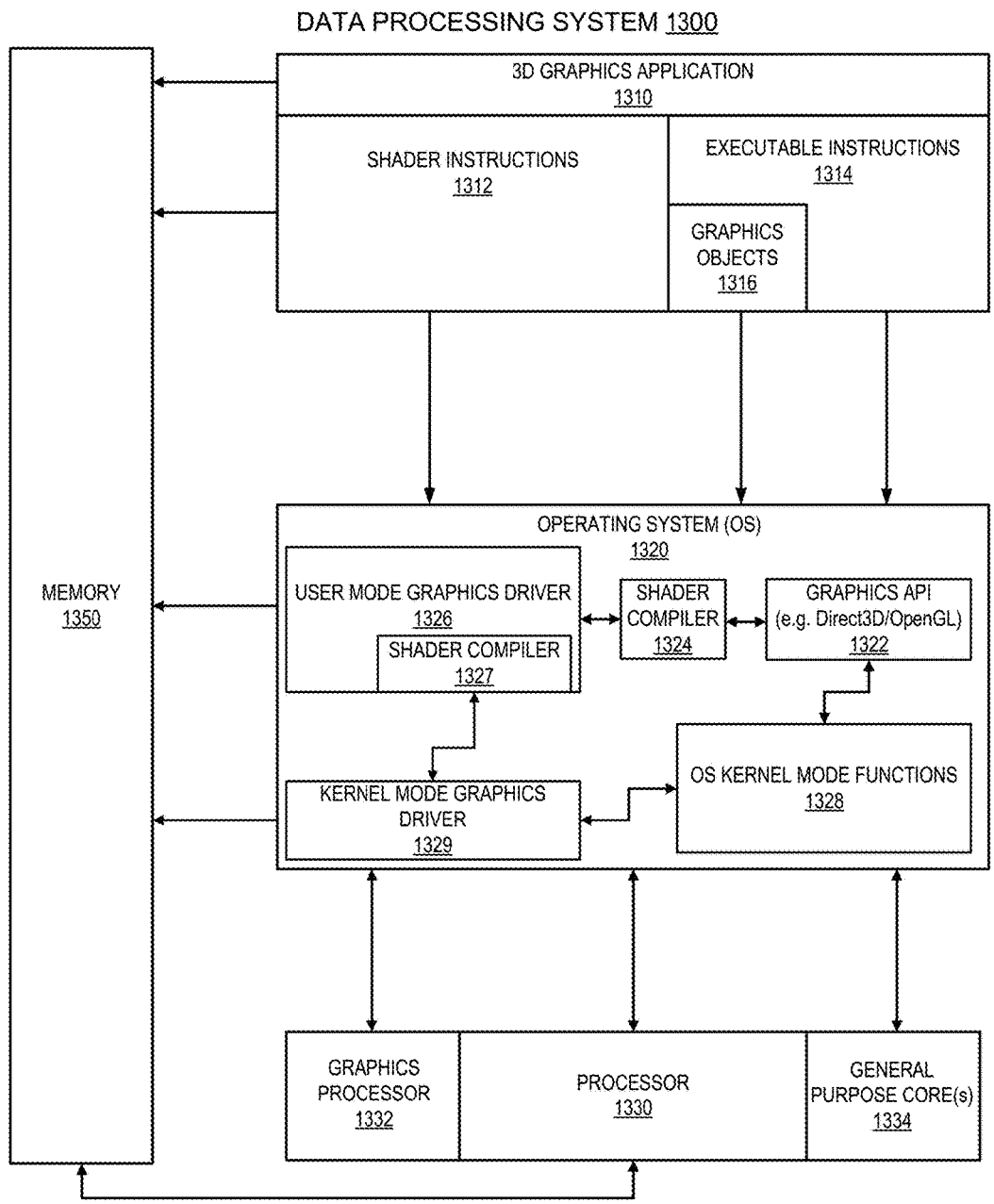

FIG. 13 illustrates exemplary graphics software architecture for a data processing system 1300 according to some embodiments. In some embodiments, software architecture includes a 3D graphics application 1310, an operating system 1320, and at least one processor 1330. In some embodiments, processor 1330 includes a graphics processor 1332 and one or more general-purpose processor core(s) 1334. The graphics application 1310 and operating system 1320 each execute in the system memory 1350 of the data processing system.

In some embodiments, 3D graphics application 1310 contains one or more shader programs including shader instructions 1312. The shader language instructions may be in a high-level shader language, such as the High Level Shader Language (HLSL) or the OpenGL Shader Language (GLSL). The application also includes executable instructions 1314 in a machine language suitable for execution by the general-purpose processor core 1334. The application also includes graphics objects 1316 defined by vertex data.

In some embodiments, operating system 1320 is a Microsoft® Windows® operating system from the Microsoft Corporation, a proprietary UNIX-like operating system, or an open source UNIX-like operating system using a variant of the Linux kernel. When the Direct3D API is in use, the operating system 1320 uses a front-end shader compiler 1324 to compile any shader instructions 1312 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1310.

In some embodiments, user mode graphics driver 1326 contains a back-end shader compiler 1327 to convert the shader instructions 1312 into a hardware specific representation. When the OpenGL API is in use, shader instructions 1312 in the GLSL high-level language are passed to a user mode graphics driver 1326 for compilation. In some embodiments, user mode graphics driver 1326 uses operating system kernel mode functions 1328 to communicate with a kernel mode graphics driver 1329. In some embodiments, kernel mode graphics driver 1329 communicates with graphics processor 1332 to dispatch commands and instructions.

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 14:
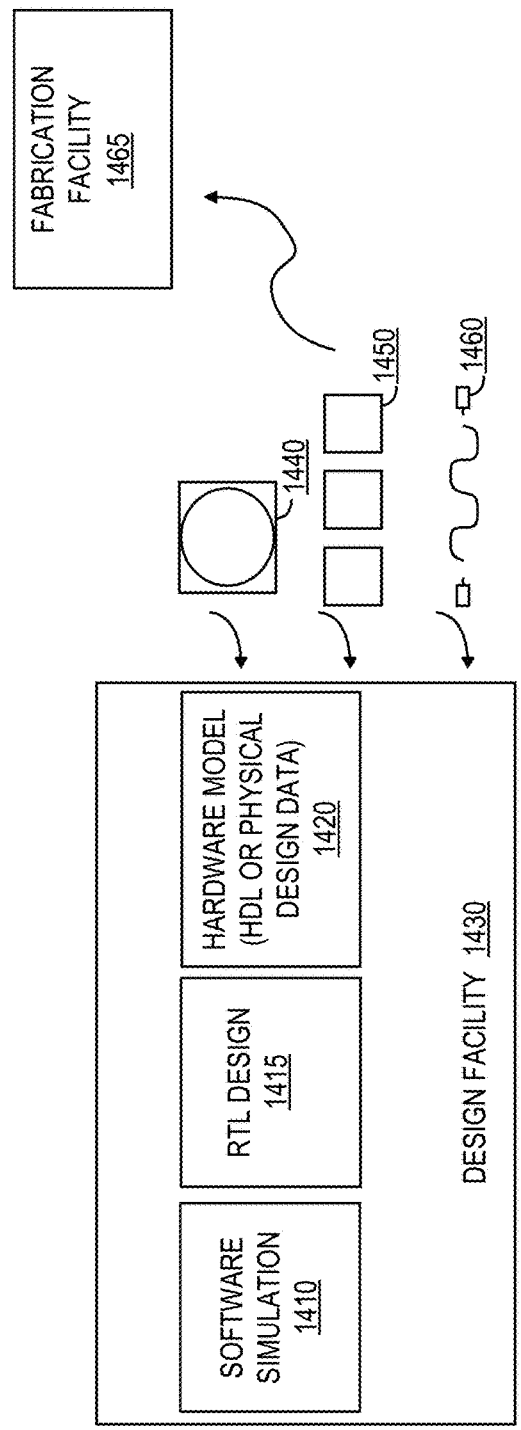
FIG. 14 illustrates a diagram of IP core development according to an embodiment.

FIG. 14 is a block diagram illustrating an IP core development system 1400 that may be used to manufacture an integrated circuit to perform operations according to an embodiment. The IP core development system 1400 may be used to generate modular, re-usable designs that can be incorporated into a larger design or used to construct an entire integrated circuit (e.g., an SOC integrated circuit). A design facility 1430 can generate a software simulation 1410 of an IP core design in a high level programming language (e.g., C/C++). The software simulation 1410 can be used to design, test, and verify the behavior of the IP core. A register transfer level (RTL) design can then be created or synthesized from the simulation model 1400. The RTL design 1415 is an abstraction of the behavior of the integrated circuit that models the flow of digital signals between hardware registers, including the associated logic performed using the modeled digital signals. In addition to an RTL design 1415, lower-level designs at the logic level or transistor level may also be created, designed, or synthesized. Thus, the particular details of the initial design and simulation may vary.

The RTL design 1415 or equivalent may be further synthesized by the design facility into a hardware model 1420, which may be in a hardware description language (HDL), or some other representation of physical design data. The HDL may be further simulated or tested to verify the IP core design. The IP core design can be stored for delivery to a 3rd party fabrication facility 1465 using non-volatile memory 1440 (e.g., hard disk, flash memory, or any non-volatile storage medium). Alternatively, the IP core design may be transmitted (e.g., via the Internet) over a wired connection 1450 or wireless connection 1460. The fabrication facility 1465 may then fabricate an integrated circuit that is based at least in part on the IP core design. The fabricated integrated circuit can be configured to perform operations in accordance with at least one embodiment described herein.

Figure 15:
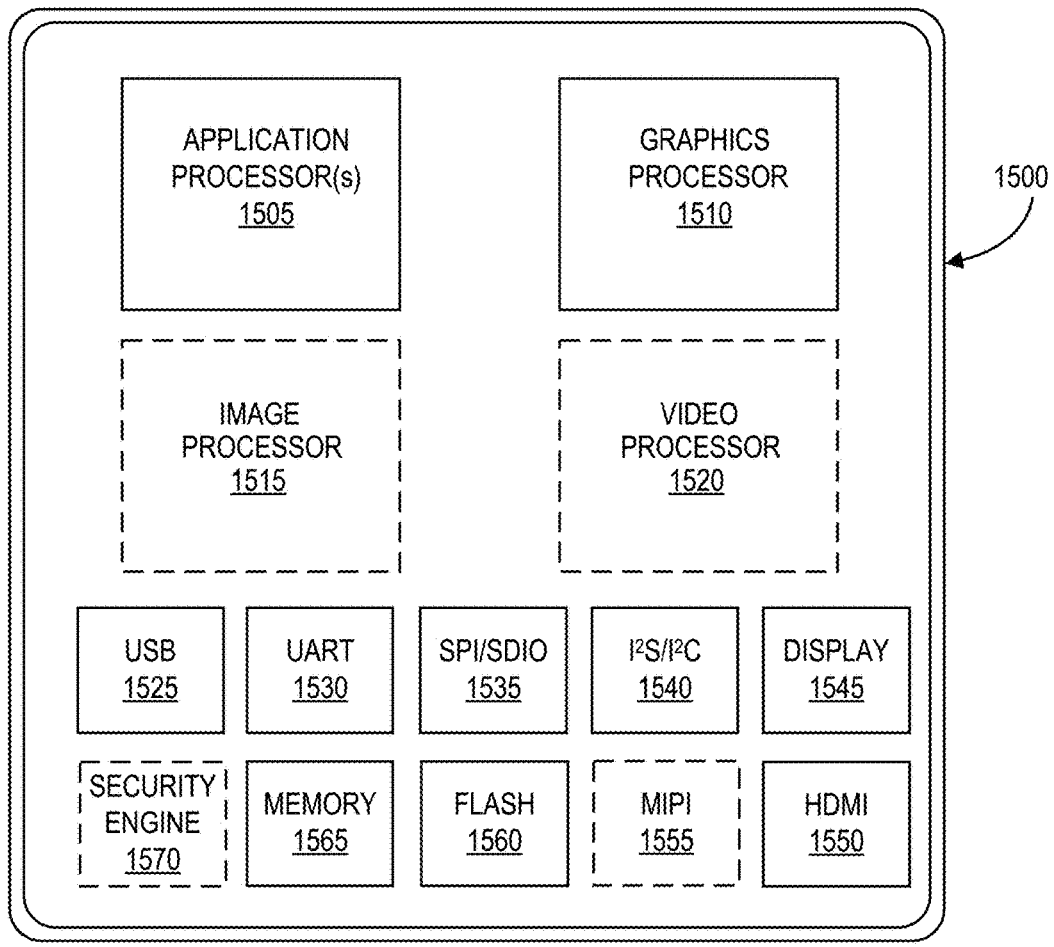

FIG. 15 is a block diagram illustrating an exemplary system on a chip integrated circuit 1500 that may be fabricated using one or more IP cores, according to an embodiment. The exemplary integrated circuit includes one or more application processors 1505 (e.g., CPUs), at least one graphics processor 1510, and may additionally include an image processor 1515 and/or a video processor 1520, any of which may be a modular IP core from the same or multiple different design facilities. The integrated circuit includes peripheral or bus logic including a USB controller 1525, UART controller 1530, an SPI/SDIO controller 1535, and an I2S/I2C controller 1540. Additionally, the integrated circuit can include a display device 1545 coupled to one or more of a high-definition multimedia interface (HDMI) controller 1550 and a mobile industry processor interface (MIPI) display interface 1555. Storage may be provided by a flash memory subsystem 1560 including flash memory and a flash memory controller. Memory interface may be provided via a memory controller 1565 for access to SDRAM or SRAM memory devices. Some integrated circuits additionally include an embedded security engine 1570.

Additionally, other logic and circuits may be included in the processor of integrated circuit 1500, including additional graphics processors/cores, peripheral interface controllers, or general purpose processor cores.

The following examples pertain to further embodiments. Example 1 optionally includes an apparatus comprising: memory to store information corresponding to a two-level Bounding Volume Hierarchy (BVH) structure; and a processor, coupled to the memory, to build and traverse the two-level BVH structure over instanced geometries, wherein each leaf node of a top-level of the two-level BVH structure is to store a transformation and a reference to a node of a geometry BVH. Example 2 optionally includes the apparatus of example 1 or any other example discussed herein, wherein the processor is to perform an operation to reduce spatial overlap in a list of instanced BVH nodes by repeatedly replacing one or more instanced nodes with an instancing of their child nodes until some termination criteria is fulfilled. Example 3 optionally includes the apparatus of any one of examples 1-2 or any other example discussed herein, wherein the processor is to perform the operation as a preprocessing pass to generate the list of instanced BVH nodes as input to a BVH building procedure. Example 4 optionally includes the apparatus of any one of examples 1-3 or any other example discussed herein, wherein the processor is to perform the operation to split leaf nodes of an existing top-level BVH, followed by a pass to improve the top-level of the BVH. Example 5 optionally includes the apparatus of any one of examples 1-4 or any other example discussed herein, wherein the processor is to apply the operation to a list of build primitives during a top-down BVH build procedure. Example 6 optionally includes the apparatus of any one of examples 1-5 or any other example discussed herein, wherein the processor is to apply the operation to build primitives when generation of the primitives improves a cost of splitting heuristic used during the generation of primitives. Example 7 optionally includes the apparatus of any one of examples 1-6 or any other example discussed herein, wherein the processor is to modify the BVH structure to allow one or more leaf nodes in the top-level of the BVH structure to reference one or more BVH sub-trees, wherein each leaf node of the top-level BVH is to correspond to a pair of instance identifier and a sub-tree identifier. Example 8 optionally includes the apparatus of any one of examples 1-7 or any other example discussed herein, wherein the instance identifier is to correspond to a transformation operation. Example 9 optionally includes the apparatus of any one of examples 1-8 or any other example discussed herein, wherein information corresponding to the transformation operation is to be cached. Example 10 optionally includes the apparatus of any one of examples 1-9 or any other example discussed herein, wherein the processor is to add one or more nodes to the BVH structure, wherein the one or more nodes are capable to directly point to one or more locations of an instanced object to allow for a more efficient traversal of the BVH structure. Example 11 optionally includes the apparatus of any one of examples 1-10 or any other example discussed herein, wherein the processor is to add one or more nodes to a top level of the BVH structure, wherein the one or more nodes are capable to directly point to one or more locations of an instanced object. Example 12 optionally includes the apparatus of any one of examples 1-11 or any other example discussed herein, wherein the processor is to comprise one or more of: a Graphics Processing Unit (GPU) and a processor core. Example 13 optionally includes the apparatus of any one of examples 1-12 or any other example discussed herein, wherein the GPU is to comprise one or more graphics processing cores. Example 14 optionally includes the apparatus of any one of examples 1-13 or any other example discussed herein, wherein the processor is to comprise one or more processor cores. Example 15 optionally includes the apparatus of any one of examples 1-14 or any other example discussed herein, wherein the processor is to comprise at least a portion of the memory. Example 16 optionally includes the apparatus of any one of examples 1-16 or any other example discussed herein, wherein the processor and the memory are on a single integrated circuit die.

Example 17 optionally includes a method comprising: storing information corresponding to a two-level Bounding Volume Hierarchy (BVH) structure in memory; and building and traversing, at a processor, the two-level BVH structure over instanced geometries, wherein each leaf node of a top-level of the two-level BVH structure stores a transformation and a reference to a node of a geometry BVH. Example 18 optionally includes the method of example 17 or any other example discussed herein, further comprising the processor performing an operation to reduce spatial overlap in a list of instanced BVH nodes by repeatedly replacing one or more instanced nodes with an instancing of their child nodes until some termination criteria is fulfilled. Example 19 optionally includes the method of any one of examples 17-18 or any other example discussed herein, further comprising the processor performing the operation as a preprocessing pass to generate the list of instanced BVH nodes as input to a BVH building procedure. Example 20 optionally includes the method of any one of examples 17-19 or any other example discussed herein, further comprising the processor performing the operation to split leaf nodes of an existing top-level BVH, followed by a pass to improve the top-level of the BVH. Example 21 optionally includes the method of any one of examples 17-20 or any other example discussed herein, further comprising the processor performing the operation during a top-down BVH build procedure to a list of build primitives that is recursively handled. Example 22 optionally includes the method of any one of examples 17-21 or any other example discussed herein, further comprising the processor performing the operation to build primitives when generation of the primitives improves a cost of splitting heuristic used during the generation of the primitives.

Example 23 optionally includes one or more computer-readable medium comprising one or more instructions that when executed on at least one processor configure the at least one processor to perform one or more operations to: store information corresponding to a two-level Bounding Volume Hierarchy (BVH) structure in memory; and building and traversing the two-level BVH structure over instanced geometries, wherein each leaf node of a top-level of the two-level BVH structure stores a transformation and a reference to a node of a geometry BVH. Example 24 optionally includes the computer-readable medium of example 23 or any other example discussed herein, further comprising one or more instructions that when executed on the at least one processor configure the at least one processor to perform one or more operations to cause the processor to perform an operation to reduce spatial overlap in a list of instanced BVH nodes by repeatedly replacing one or more instanced nodes with an instancing of their child nodes until some termination criteria is fulfilled. Example 25 optionally includes the computer-readable medium of any one of examples 23-24 or any other example discussed herein, further comprising one or more instructions that when executed on the at least one processor configure the at least one processor to perform one or more operations to cause the processor to perform the operation performing the operation as a preprocessing pass to generate the list of instanced BVH nodes as input to a BVH building procedure.

Example 26 optionally includes a system comprising: memory to store information corresponding to a two-level Bounding Volume Hierarchy (BVH) structure; a processor, coupled to the memory, to build and traverse the two-level BVH structure over instanced geometries; and a display device to display one or more images corresponding to the two-level BVH structure, wherein each leaf node of a top-level of the two-level BVH structure is to store a transformation and a reference to a node of a geometry BVH. Example 27 optionally includes the system of example 26 or any other example discussed herein, wherein the processor is to perform an operation to reduce spatial overlap in a list of instanced BVH nodes by repeatedly replacing one or more instanced nodes with an instancing of their child nodes until some termination criteria is fulfilled. Example 28 optionally includes the system of any one of examples 26-27 or any other example discussed herein, wherein the processor is to perform the operation as a preprocessing pass to generate the list of instanced BVH nodes as input to a BVH building procedure.

Example 29 optionally includes an apparatus comprising means to perform a method as set forth in any preceding example. Example 30 comprises machine-readable storage including machine-readable instructions, when executed, to implement a method or realize an apparatus as set forth in any preceding example.

In various embodiments, the operations discussed herein, e.g., with reference to FIGS. 1-15, may be implemented as hardware (e.g., logic circuitry), software, firmware, or combinations thereof, which may be provided as a computer program product, e.g., including a tangible (e.g., non-transitory) machine-readable or computer-readable medium having stored thereon instructions (or software procedures) used to program a computer to perform a process discussed herein. The machine-readable medium may include a storage device such as those discussed with respect to FIGS. 1-15.

Additionally, such computer-readable media may be downloaded as a computer program product, wherein the program may be transferred from a remote computer (e.g., a server) to a requesting computer (e.g., a client) by way of data signals provided in a carrier wave or other propagation medium via a communication link (e.g., a bus, a modem, or a network connection).

Reference in the specification to "one embodiment" or "an embodiment" means that a particular feature, structure, and/or characteristic described in connection with the embodiment may be included in at least an implementation. The appearances of the phrase "in one embodiment" in various places in the specification may or may not be all referring to the same embodiment.

Also, in the description and claims, the terms "coupled" and "connected," along with their derivatives, may be used. In some embodiments, "connected" may be used to indicate that two or more elements are in direct physical or electrical contact with each other. "Coupled" may mean that two or more elements are in direct physical or electrical contact. However, "coupled" may also mean that two or more elements may not be in direct contact with each other, but may still cooperate or interact with each other.

Thus, although embodiments have been described in language specific to structural features and/or methodological acts, it is to be understood that claimed subject matter may not be limited to the specific features or acts described. Rather, the specific features and acts are disclosed as sample forms of implementing the claimed subject matter.

The invention claimed is:

1. An apparatus comprising:
memory to store information corresponding to a two-level Bounding Volume Hierarchy (BVH) structure; and
a processor, coupled to the memory, to build and traverse the two-level BVH structure over instanced geometries to increase performance for ray tracing of scenes that use the instanced geometries,
wherein each leaf node of a top-level of the two-level BVH structure is to store a transformation and a reference to a node of a geometry BVH, wherein the processor is to add one or more nodes to the two-level BVH structure, wherein the one or more nodes are to directly point to one or more locations of an instanced object to allow for a more efficient traversal of the two-level BVH structure, wherein the processor is to perform an operation to reduce spatial overlap in a list of instanced BVH nodes by repeatedly replacing one or more instanced nodes with an instancing of their child nodes until a termination criteria is fulfilled, wherein the processor is to accelerate rendering by modifying the two-level BVH structure to skip those nodes in the two-level BVH structure that would lead to an overlapping instance to allow for more efficient traversing of the two-level BVH structure, wherein the processor is to perform the operation as a preprocessing pass to generate the list of instanced BVH nodes as input to a BVH building procedure.

2. The apparatus of claim 1, wherein the processor is to perform the operation to split leaf nodes of an existing top-level BVH, followed by a pass to improve the top-level of the two-level BVH structure.

3. The apparatus of claim 1, wherein the processor is to apply the operation to a list of build primitives during a top-down BVH build procedure.

4. The apparatus of claim 1, wherein the processor is to apply the operation to build primitives when generation of the primitives improves a cost of splitting heuristic used during the generation of primitives.

5. The apparatus of claim 1, wherein the processor is to modify the two-level BVH structure to allow one or more leaf nodes in the top-level of the two-level BVH structure to reference one or more BVH sub-trees, wherein each leaf node of the top-level BVH is to correspond to a pair of instance identifier and a sub-tree identifier.

6. The apparatus of claim 5, wherein the instance identifier is to correspond to a transformation operation.

7. The apparatus of claim 6, wherein information corresponding to the transformation operation is to be cached.

8. The apparatus of claim 1, wherein the processor is to add one or more nodes to a top level of the two-level BVH structure, wherein the one or more nodes of the top level are to directly point to one or more locations of the instanced object.

9. The apparatus of claim 1, wherein the processor is to comprise one or more of:
a Graphics Processing Unit (GPU) and a processor core.

10. The apparatus of claim 9, wherein the GPU is to comprise one or more graphics processing cores.

11. The apparatus of claim 1, wherein the processor is to comprise one or more processor cores.

12. The apparatus of claim 1, wherein the processor is to comprise at least a portion of the memory.

13. The apparatus of claim 1, wherein the processor and the memory are on a single integrated circuit die.

14. The apparatus of claim 1, wherein the termination criteria is based on at least one of: a relative number of new nodes generated, a number of splits performed, total or relative memory overhead, a target fraction of unbraided BVH nodes per input primitive, and a target fraction of unbraided BVH nodes per instanced input primitive.

15. The apparatus of claim 1, wherein the termination criteria is based on at least a total or a relative memory overhead.

16. A method comprising:
storing information corresponding to a two-level Bounding Volume Hierarchy (BVH) structure in memory; and
building and traversing, at a processor, the two-level BVH structure over instanced geometries to increase performance for ray tracing of scenes that use the instanced geometries,
wherein each leaf node of a top-level of the two-level BVH structure stores a transformation and a reference to a node of a geometry BVH, wherein one or more nodes are added to the two-level BVH structure, wherein the one or more nodes are to directly point to one or more locations of an instanced object to allow for a more efficient traversal of the two-level BVH structure, wherein the processor performs an operation to reduce spatial overlap in a list of instanced BVH nodes by repeatedly replacing one or more instanced nodes with an instancing of their child nodes until some termination criteria is fulfilled, wherein the processor accelerates rendering by modifying the two-level BVH structure to skip those nodes in the two-level BVH structure that would lead to an overlapping instance to allow for more efficient traversing of the two-level BVH structure, wherein the processor performs the operation as a preprocessing pass to generate the list of instanced BVH nodes as input to a BVH building procedure.

17. The method of claim 16, further comprising the processor performing the operation to split leaf nodes of an existing top-level BVH, followed by a pass to improve the top-level of the two-level BVH structure.

18. The method of claim 16, further comprising the processor performing the operation during a top-down BVH build procedure to a list of build primitives that is recursively handled.

19. One or more non-transitory computer-readable medium comprising one or more instructions that when executed on at least one processor configure the at least one processor to perform one or more operations to:
store information corresponding to a two-level Bounding Volume Hierarchy (BVH) structure in memory; and
building and traversing the two-level BVH structure over instanced geometries to increase performance for ray tracing of scenes that use the instanced geometries,
wherein each leaf node of a top-level of the two-level BVH structure stores a transformation and a reference to a node of a geometry BVH, wherein the processor is to add one or more nodes to the two-level BVH structure, wherein the one or more nodes are to directly point to one or more locations of an instanced object to allow for a more efficient traversal of the two-level BVH structure, wherein the processor is to perform an operation to reduce spatial overlap in a list of instanced BVH nodes by repeatedly replacing one or more instanced nodes with an instancing of their child nodes until some termination criteria is fulfilled, wherein the processor is to accelerate rendering by modifying the two-level BVH structure to skip those nodes in the two-level BVH structure that would lead to an overlapping instance to allow for more efficient traversing of the two-level BVH structure, wherein the processor is to perform the operation as a preprocessing pass to generate the list of instanced BVH nodes as input to a BVH building procedure.

20. The one or more non-transitory computer-readable medium of claim 19, further comprising one or more instructions that when executed on the at least one processor configure the at least one processor to perform one or more operations to cause the processor to split leaf nodes of an existing top-level BVH, followed by a pass to improve the top-level of the two-level BVH structure.

21. The one or more non-transitory computer-readable medium of claim 19, further comprising one or more instructions that when executed on the at least one processor configure the at least one processor to perform one or more operations to cause the processor to build primitives when generation of the primitives improves a cost of splitting heuristic used during the generation of the primitives.

* * * * *